United States Patent [19]

Dawson et al.

[11] Patent Number: 4,884,220

[45] Date of Patent: Nov. 28, 1989

[54] ADDRESS GENERATOR WITH VARIABLE SCAN PATTERNS

[75] Inventors: John F. Dawson; Joseph W. Bednarski, both of Albuquerque; Marie A. Stoffer, Rio Rancho; James A. Cousens, Albuquerque, all of N.M.

[73] Assignee: Honeywell Inc., Minneapolis, Minn.

[21] Appl. No.: 203,660

[22] Filed: Jun. 7, 1988

[51] Int. Cl.[4] .............................................. G06F 15/62
[52] U.S. Cl. .................................... 364/521; 364/518; 340/736
[58] Field of Search ........ 364/518, 521, 200 MS File, 364/900 MS File; 340/736, 750

[56] References Cited

U.S. PATENT DOCUMENTS

| | | | |
|---|---|---|---|
| 4,228,432 | 10/1980 | Osborne | 364/521 |
| 4,387,370 | 6/1983 | Katagi | 340/750 |
| 4,511,962 | 4/1985 | Machida | 340/750 |
| 4,660,157 | 4/1987 | Beckwith et al. | 364/518 |
| 4,742,343 | 5/1988 | O'Donnell | 340/750 |
| 4,841,292 | 6/1989 | Zemo | 340/736 |

Primary Examiner—David L. Clark
Assistant Examiner—Raymond J. Bayerl
Attorney, Agent, or Firm—Arnold L. Albin

[57] ABSTRACT

An apparatus for reading a first addressable memory and writing into a second addressable memory wherein the first addressable memory is logically arranged in a rectangular matrix and is scanned at an arbitrary angle with respect to the matrix for producing a plurality of scan patterns whose parameters can be altered and controlled by an external source, while the second addressable memory, also arranged in a rectangular matrix, is written into along parallel rows and columns. The apparatus is particularly adapted for use with a digital map display system having an airborne computer for generation the scan parameters.

14 Claims, 20 Drawing Sheets

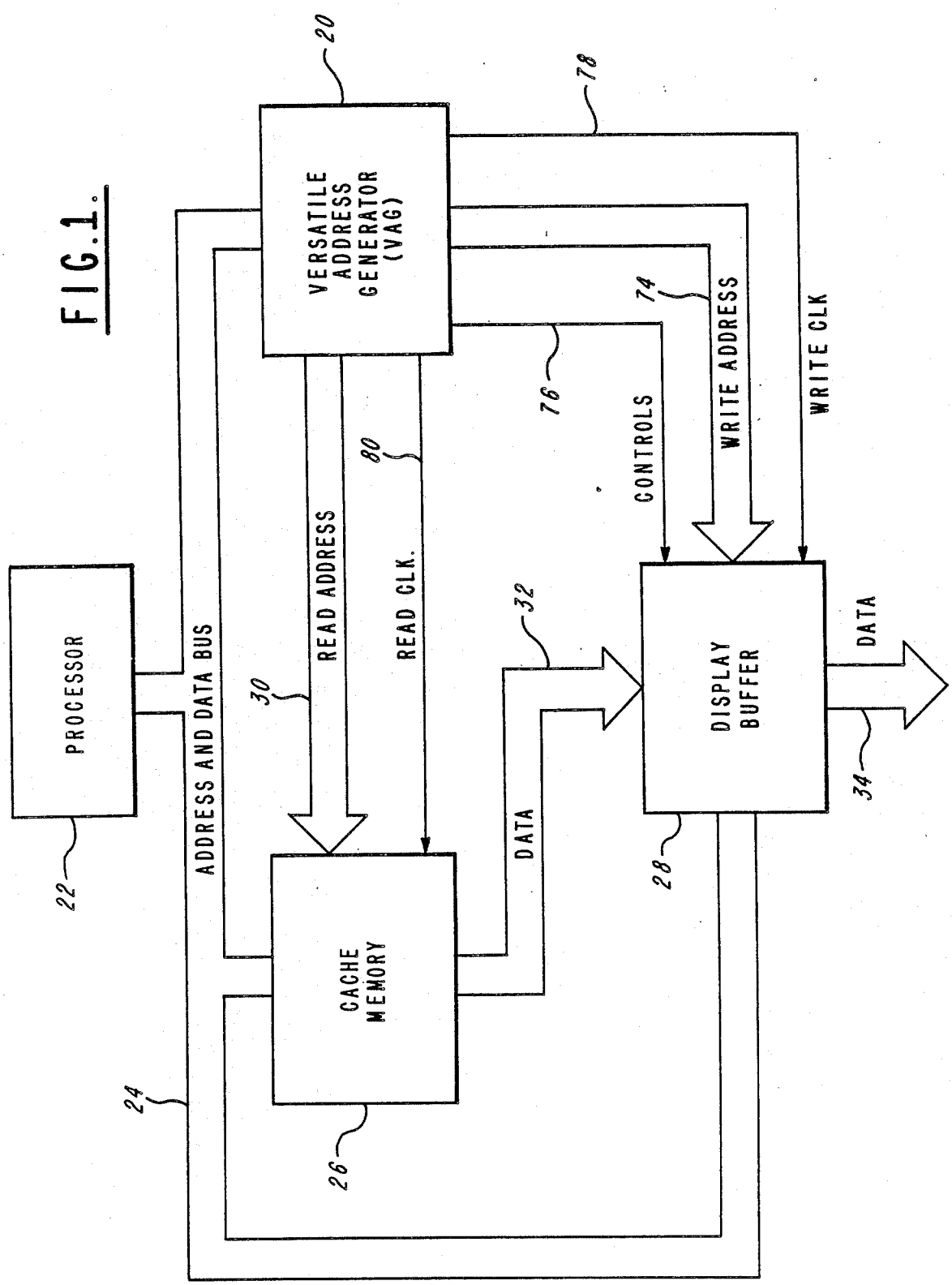

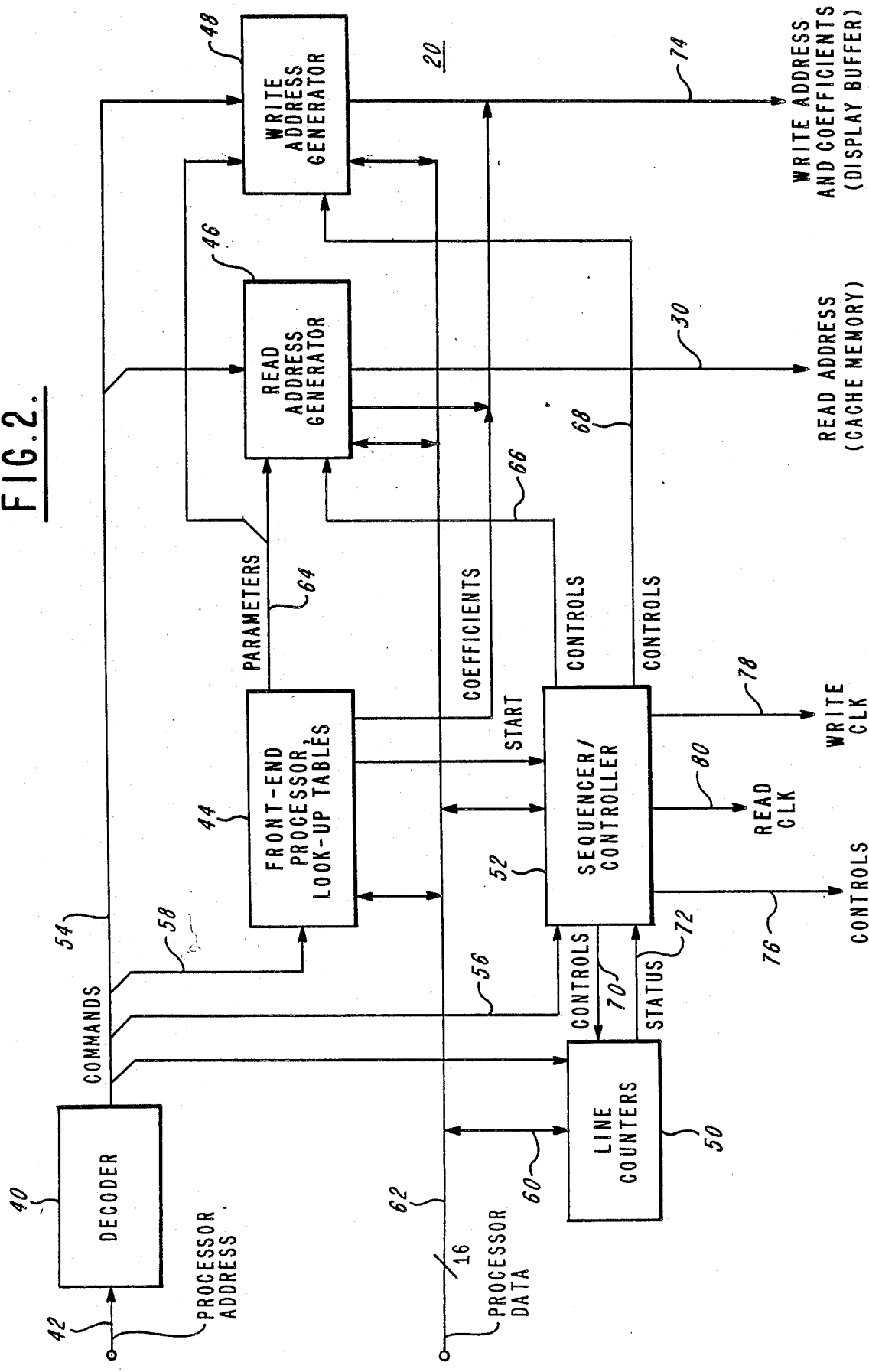

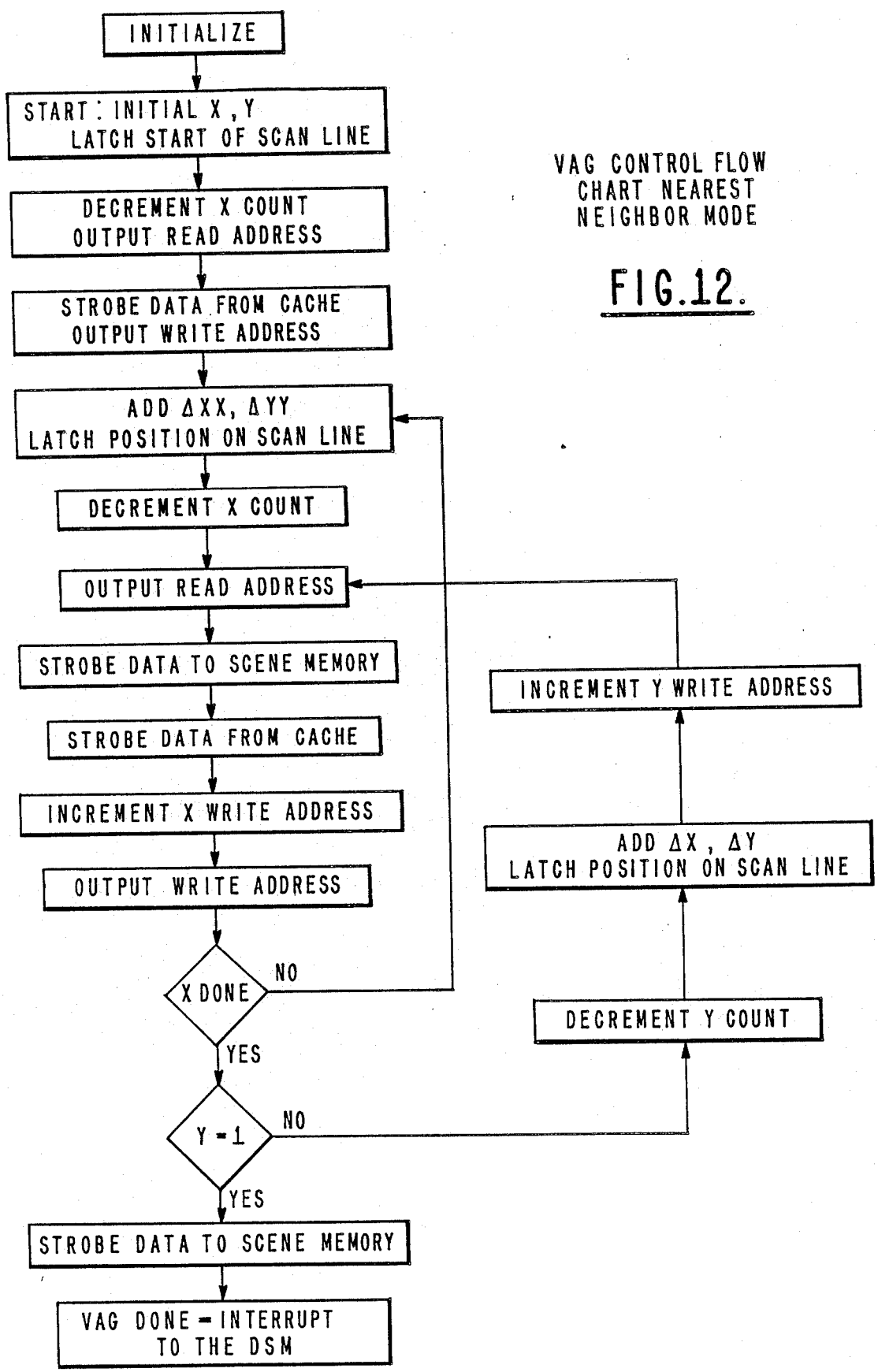

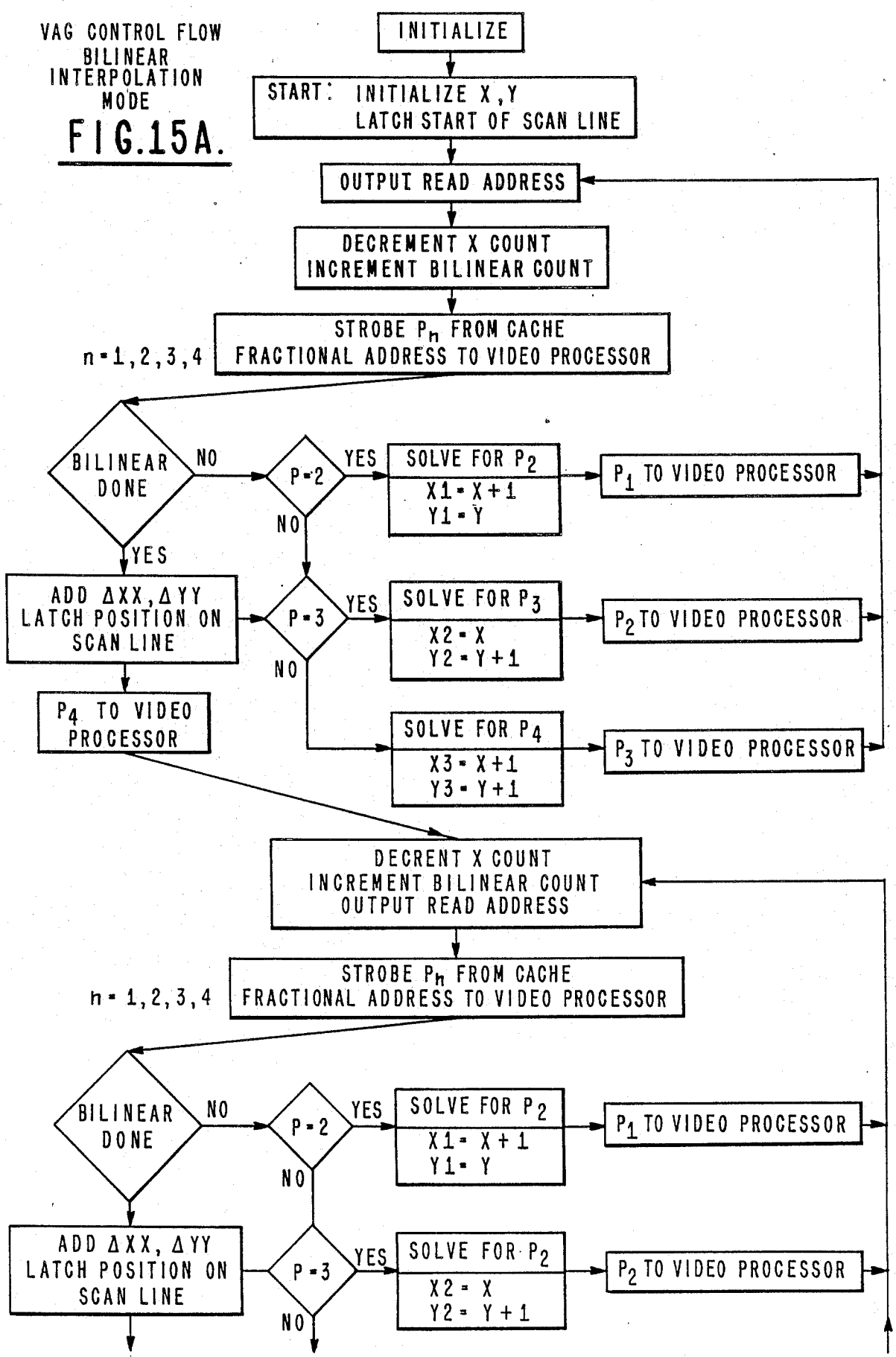
FIG.15A. VAG CONTROL FLOW BILINEAR INTERPOLATION MODE

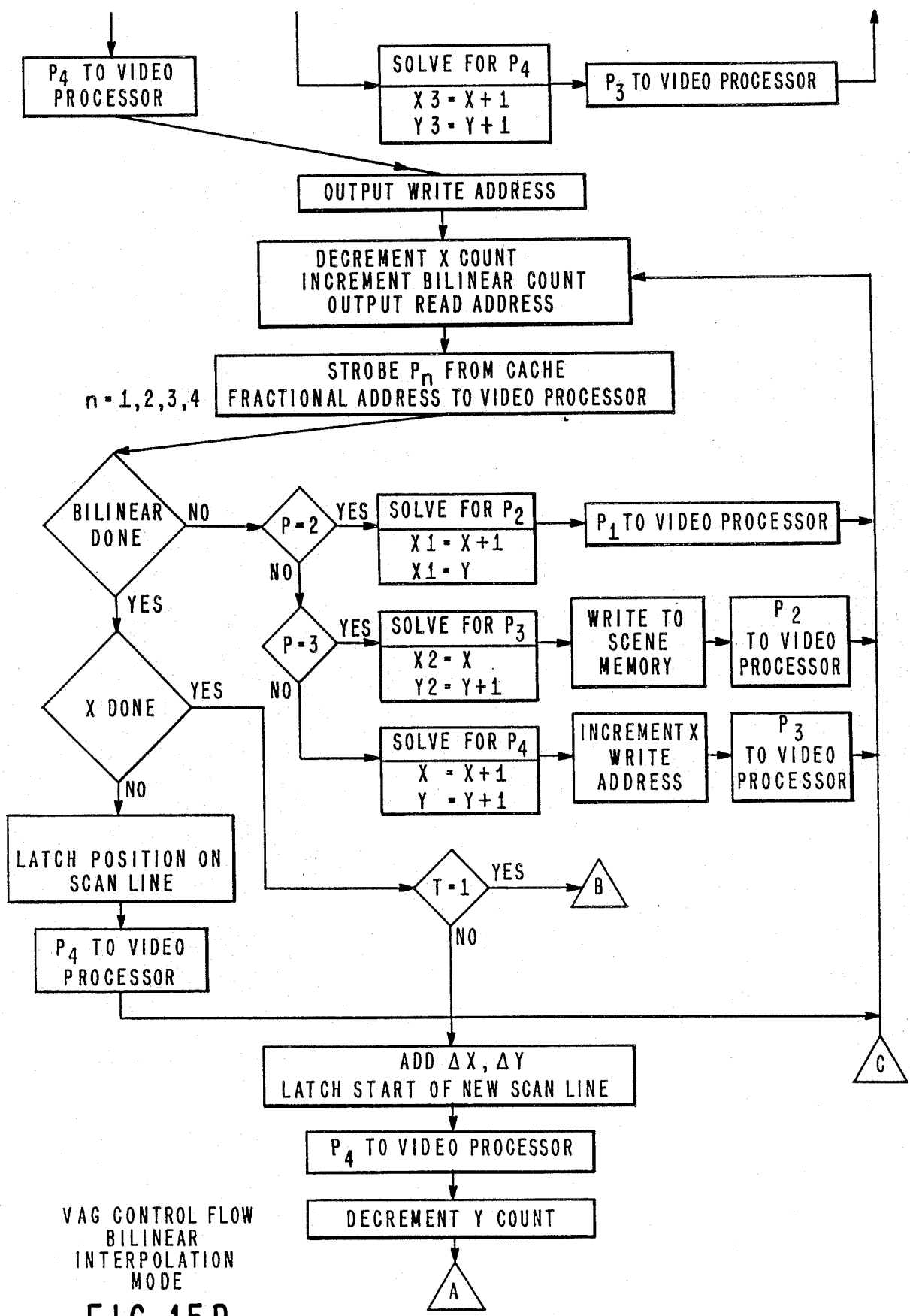

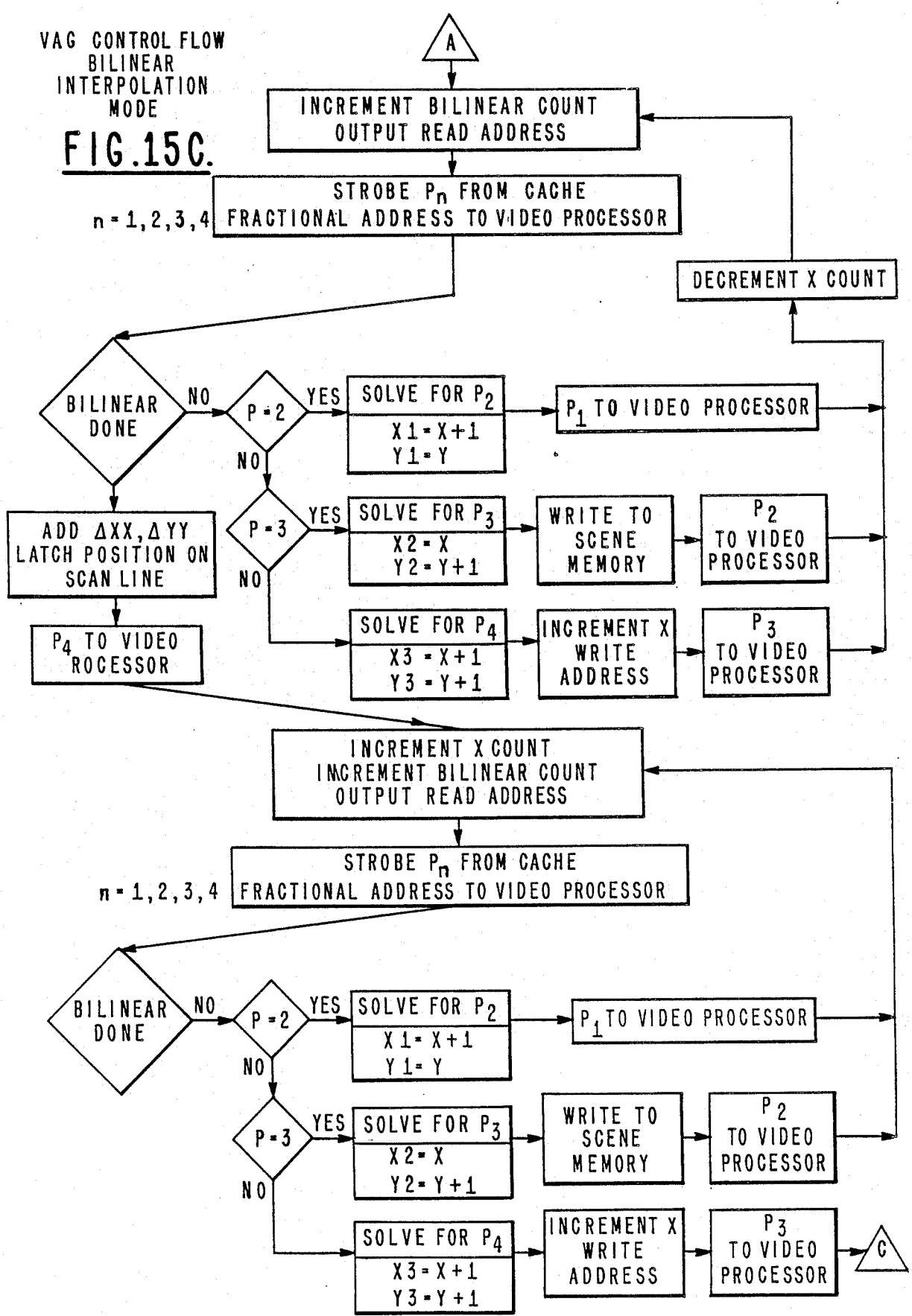
FIG.15C. VAG CONTROL FLOW BILINEAR INTERPOLATION MODE

VAG CONTROL FLOW
BILINEAR INTERPOLATION MODE

PERSPECTIVE VIEW
SCAN MODE
FLOW DIAGRAM

INTERVISIBILITY
SCAN MODE FLOW DIAGRAM

| VAG SEQUENCER OUTPUTS | SEQ. START |
|---|---|

| Signal | Values |
|---|---|
| SEQUENCER ADDRESS (10:3)(SEQ_ADDR)(10:3) | 000 X 001 X 002 |
| CONDITION INPUT MULTIPLEXER SELECTS(1:0) (MUXSEL 1, MUXSEL 0) | 0 X 1 |
| X RD. ADDR. GEN. A OPERAND SELECTS (1:0) (X_A_OPSEL 1, X_A_OPSEL 0)<br>  0 = DELTA X<br>  1 = DELTA YY<br>  2 = ZERO<br>  3 = ONE (INTEGER ONE) | 2 X ** X ** |
| Y RD. ADDR. GEN. A OPERAND SELECTS(1:0) (Y_A_OPSEL, Y_A_OPSEL 0)<br>  0 = DELTA Y<br>  1 = DELTA YY<br>  2 = ZERO<br>  3 = ONE (INTEGER ONE) | 2 X ** X ** |
| X AND Y RD. ADDR. GEN. B OPERAND SELECT (B_OPSEL)<br>  0 = SUM X/Y<br>  1 = START X/1 | ** |
| LINE COUNTER ENABLE (LINE_CNT_EN*) | |
| START X/Y REGISTER LOAD ENABLE (LD_START*) | |
| SUM X/Y REGISTER LOAD ENABLE (LD_SUM*) | ** |
| VIDEO PROCESSOR ENABLE TO START USING CACHE DATA (ST_P*)** | |
| DISPLAY MEMORY WRITE PHASE SELECT (WR_PHASE) | |
| DISPLAY MEMORY WRITE ENABLE (DM_WR_EN*) | ** |
| CACHE MEMORY READ PHASE SELECT (RD_PHASE) | |
| CACHE MEMORY READ ENABLE (CM_RD_EN*) | ** |
| INVALID CONDITION INPUT ADDRESS TO SEQUENCER (TIMEOUT*) | |
| SEQUENCER PERFORMING SEQUENCE (USED TO INDICATE THAT SEQUENCE HAS NOT YET ENDED) (SEQLOST*) | |
| END OF SEQUENCE HAS BEEN REACHED (STOP*) | |
| ENABLE TO INCREMENT/DECREMENT X WRITE ADDRESS (X_WR_EN*) | ** |
| X WRITE ADDRESS INCREMENT/DECREMENT (X_UPDN) | ** |
| RESET X WRITE ADDRESS TO ZERO (RST_X_WR*) | ** |
| ENABLE TO INCREMENT/DECREMENT Y WRITE ADDRESS (Y_WR_EN*) | ** |
| Y WRITE ADDRESS INCREMENT/DECREMENT (Y_UPDN) | ** |

** DEPENDS ON MODE BEING EXECUTED

FIG. 19A.

ADDRESS GENERATOR WITH VARIABLE SCAN PATTERNS

BACKGROUND OF THE INVENTION

This invention was made with United States Government support and the U.S. Government has certain rights therein.

1. Field of the Invention

The invention relates to apparatus for reading a first addressable memory and writing to a second addressable memory, and more particularly to such apparatus for display of images represented by digital data, where the first addressable memory is logically arranged in a rectangular matrix and scanned at an arbitrary angle with respect to the matrix for producing a plurality of scan patterns whose parameters can be altered and controlled by an external source The second addressable memory is logically arranged and written in a rectangular matrix format.

2. Description of the Prior Art

Address generators in which data to be displayed are stored in the form of digital data are well known. Representation of characters or images in digital form provides a convenient way in which to transmit or process the data, especially in cartographic displays.

One such address generator is disclosed in copending patent application Ser. No. 192,798, filed May 11, 1988, Digital Map Display, assigned to the assignee of the present invention. In the referenced application an addressable memory is scanned in rows or columns parallel to the rectangular matrix in which the data is stored. Hence, to provide a rotated image, or one which is not symmetrically scanned with respect to the memory plane, requires extensive additional processing and computational time.

Another address generator adapted for use in a digital map display system is taught by Walter, et al, in U.S. Pat. No. 4,477,802, issued Oct. 16, 1984. This invention discloses an address generator capable of generating addresses which lie along parallel lines angularly disposed with respect to the orientation of the rows and columns of storage elements in the memory. However, the Walter invention does not provide for generating areas having an asymmetrical or non-rectangular configuration and provides for generation only of sequential addresses. Thus, it is not suitable for applications which process image data bilinearly and hence scan the stored addresses non-sequentially. Further, the aforesaid invention does not provide for reading from a first memory and writing into a second full field memory, and can update map data only one row or column at a time between successive fields of displayed map data.

In a typical display system, the screen or display space of the display device may be thought of as comprising a plurality of picture elements or cells (sometimes called "pixels") arranged in rows and columns. Each point may therefore be defined by the X and Y coordinates of a Cartesian grid. Data representing, for example, the intensity or color of light to be displayed at each particular segment of the screen may be produced in a known manner and stored in a random-access memory of a general purpose computer, along with data representing the X and Y coordinates of that element's position on the screen.

To cause an image to be displayed, the computer transfers the image information to a frame buffer or storage array, the individual elements of which are arranged to form a Cartesian grid corresponding to the Cartesian grid formed by the picture elements or raster of the display screen. A display control unit retrieves the data from the display buffer in accordance with the particular raster of the display device and activates the display device to display an image corresponding to the data stored in the frame buffer. Thus, the X and Y coordinate data stored in the computer determines the position in the frame buffer in which each unit of image data is stored and the pattern of data stored in the frame buffer determines the image to be displayed.

The problem being confronted was the means required in a digital map computer to scan out of a cache memory an arbitrarily rotated and zoomed pattern which maintained a fixed resolution. These patterns include a trapezoidal pattern for the generation of a perspective view of digital terrain data, a star pattern for the overlay of an intervisibility function, and a rectangular pattern for a top-down plan view of digitized aeronautical charts and digital terrain data. The mismatch between the regular Cartesian pixel grid array of cache memory and the various patterns required for the display formats had to be compensated for in such a manner that the displayed image remained smooth and stable under animation.

The known prior art has not attempted to support the programmability of the patterns nor the variety of patterns available in the present invention. The perspective view format has been implemented previously via a radial scan pattern similar to the star pattern of this invention. Each ray projected from the viewpoint onto cache memory corresponds to a column of pixels on the display device. Each sample along the ray corresponds to a row of pixels on the display device. Plan view has been implemented previously with a parallel scan algorithm similar to the rectangular pattern algorithm presented here. The nearest neighbors surrounding the calculated scan address of the cache memory addresses is determined. The terrain data is then transferred to the display control unit for graphic rendering and display.

The shortcomings of the previous method of perspective view generation do not allow for locking the scan pattern to the terrain (i.e., synchronization with the cache addresses). As a result, the interpolation calculations that are performed to map the scan addresses (rows and columns of pixels on the display) onto the Cartesian grid of the cache memory (terrain data base) cause a fluctuation of the image under animation. Thus, the frame to frame coherence problem causes degraded image quality. A scanning capability limited to parallel or radial scans limits the formats that may be supported. Digital map applications are substantially enhanced by overlays onto the background terrain image. A programmable pattern scanner can support new applications as mission requirements change.

This invention differs from the prior methods of perspective view generation in that a trapezoidal scan pattern is used instead of the radial scan method. The trapezoidal pattern is generated by an orthographic projection of the truncated view volume onto the cache memory (terrain data). The radial scan concept is retained, but used for an intervisibility overlay instead of the perspective view generation. The radial scan is enhanced to include a full 360 degree arc with programmable attributes. The rectangular pattern retains the parallel scan methodology for plan view map generation. Both a nearest neighbor and a full bilinear interpolation method of scan address generation are implemented.

The shortcomings of the prior method of perspective view generation are solved by this invention. The interior scan pattern of the trapezoid is locked to the horizontal axis of the cache memory. This guarantees that the terrain data posts selected (cache memory addresses) are consistent from frame to frame under animation. The image quality of the plan view rectangular parallel scan can be more precisely controlled by selecting either a nearest neighbor algorithm or the full bilinear interpolation algorithm. Under bilinear interpolation, the four nearest neighbors in cache memory are selected surrounding the generated scan address and used to calculate an intermediate point instead of the default selection under single nearest neighbor. The additional radial pattern for intervisibility is implemented with programmable attributes to accommodate a variety of mission requirements.

SUMMARY OF THE INVENTION

The present invention relates to an address generator for scanning an addressable memory logically configured in a rectangular matrix, which receives data and instructions from an external source, and generates scan parameters, the parameters being programmable for providing a predetermined scan pattern. It includes:

a processor coupled to receive the commands for computing angles of an envelope defining the contour of a scan pattern and angles of rotation for successive lines of said scan pattern, a read address generator responsive to the processor for providing incremental horizontal and vertical values for generating each line of the scan pattern, a write address generator coupled to receive the scan pattern for generating sequential write addresses for writing into a further addressable memory configured in a rectangular matrix, a counter for counting the number of incremental addresses in accordance with a predetermined line length and the number of scan lines in accordance with a predetermined line count and for providing a signal indicative of the completion of each line and indicative of the generation of a complete frame at the completion of the line count, and a timing source for generating timing and sequencing signals for generating each scan line, reading the scan lines into the first addressable memory, and writing the contents of the first addressable memory into the second addressable memory.

In a further preferred embodiment, the contents of the second addressable memory are written into a digital display.

The invention solves a number of problems in the area of digital map display generation. The address generator supports perspective view, intervisibility, plan view, data frames, and aeronautical chart display formats while minimizing hardware. It retains full programmability of aircraft parameters and view selection attributes such as roll, pitch, heading, position, slew, view angle, look down angle, front and back clipping planes, and zoom. It maintains high image quality (1K×1K resolution) while scanning patterns at a 20 Hertz frame update rate. The nature of the patterns scanned out for further processing guarantees the frame to frame coherence of the animation, eliminating boiling, strobing, and greatly reducing aliasing artifacts. The invention can be applied to any system requiring rapid memory-to-memory block transfer of data in arbitrary patterns.

BRIEF DESCRIPTION OF THE DRAWINGS

FIG. 1 is a block diagram showing the present invention and its interface with a digital map display system.

FIG. 2 is a block diagram showing a preferred embodiment of the present invention.

FIG. 12 is a flow chart showing operation in the nearest neighbor mode.

DESCRIPTION OF THE PREFERRED EMBODIMENT

Figure 3A:
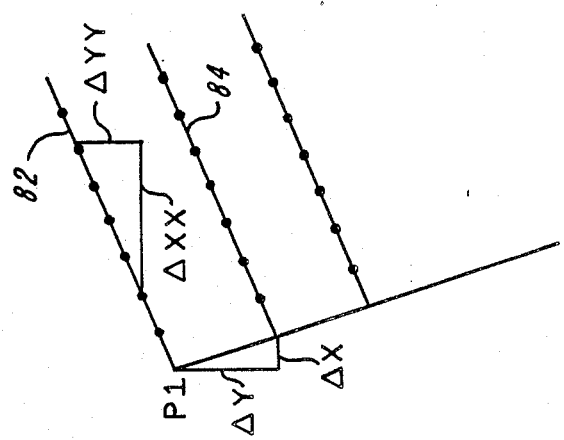
FIG. 3 is a diagram showing a rectangular scan pattern generated by the present invention.

Referring now to FIG. 1, there is shown the interconnections of an address generator 20 to a digital map display system. Address generator 20 receives instructions and control signals from a processor 22 via address and data bus 24. The processor 22 can be designed in the form of a microprocessor which receives aircraft and map data in digital form from an auxiliary airborne computer (not shown). The bus 24 also provides address and data signals and receives status information from cache memory 26 and display buffer 28. Address generator 20 provides read address commands along X and Y Cartesian coordinates which form a rectangular matrix via bus 30 and read clock strobe 80 to cache memory 26, and write addresses and control signals to display buffer 28. The data read out of cache memory 26 is coupled into display buffer 28 via data bus 32. Display buffer 28 feeds a full-field bit-mapped memory (not shown) via data bus 34. Display data is extracted from the cache memory 26 and transferred to the bit-mapped memory in blocks, controlled by the address generator 20, which outputs a write address 74 and write clock strobe 78 to write the data and control signals 76 into the display buffer 28 and bit-mapped memory at a specified location.

Referring now to FIG. 2, the structural details of the address generator 20 are shown in greater detail. Address signals from processor 22 are applied to a decoder 40 via a bus 42. Decoder 40 provides output commands such as initialization of the initial X and Y coordinate starting points, and initial X and Y pixel and line count and scan mode. Decoder 40 is a set of gates for routing information from a single source to different destinations at different times. Such a circuit is also referred to as a demultiplexer. Such demultiplexers are available as standard integrated circuit components which can be configured in arrays to decode any size data words.

The address generator 20 consists essentially of five function blocks: a front-end processor 44, a read address generator 46, a write address generator 48, X and Y line counters 50 and a timing and sequencer controller 52. The commands from decoder 40 are coupled to read address generator 46 and write address generator 48 on bus 54. Further commands to timing and sequence controller 52 are applied on bus 56 and to front-end processor 44 via bus 58. Line counters 50 receive initialization commands and send status commands on bus 60 to data bus 62, which is energized by the processor 22. Front-end processor 44 which may comprise addressable sine and cosine lookup tables, provides computed control parameters to read address generator 46 and write address generator 48 on bus 64.

The timing and sequence controller 52 distributes the priorities of access to the read and write generators via lines 66 and 68 and to the line counters via line 70. Line counter status, such as X DONE, Y DONE, is returned via line 72. Timing and sequence controller 52 provides the control timing and clock signals required by the various other circuit elements. The control logic can be designed by well known techniques. Processor 22 also controls timing and sequence controller 52 by initiating performance and specifying what scan mode is to be performed.

The output of read address generator 46 is applied to the cache memory 26 via bus 30. Write address generator 48 provides a write address via bus 74 to display buffer 28.

Figure 3:
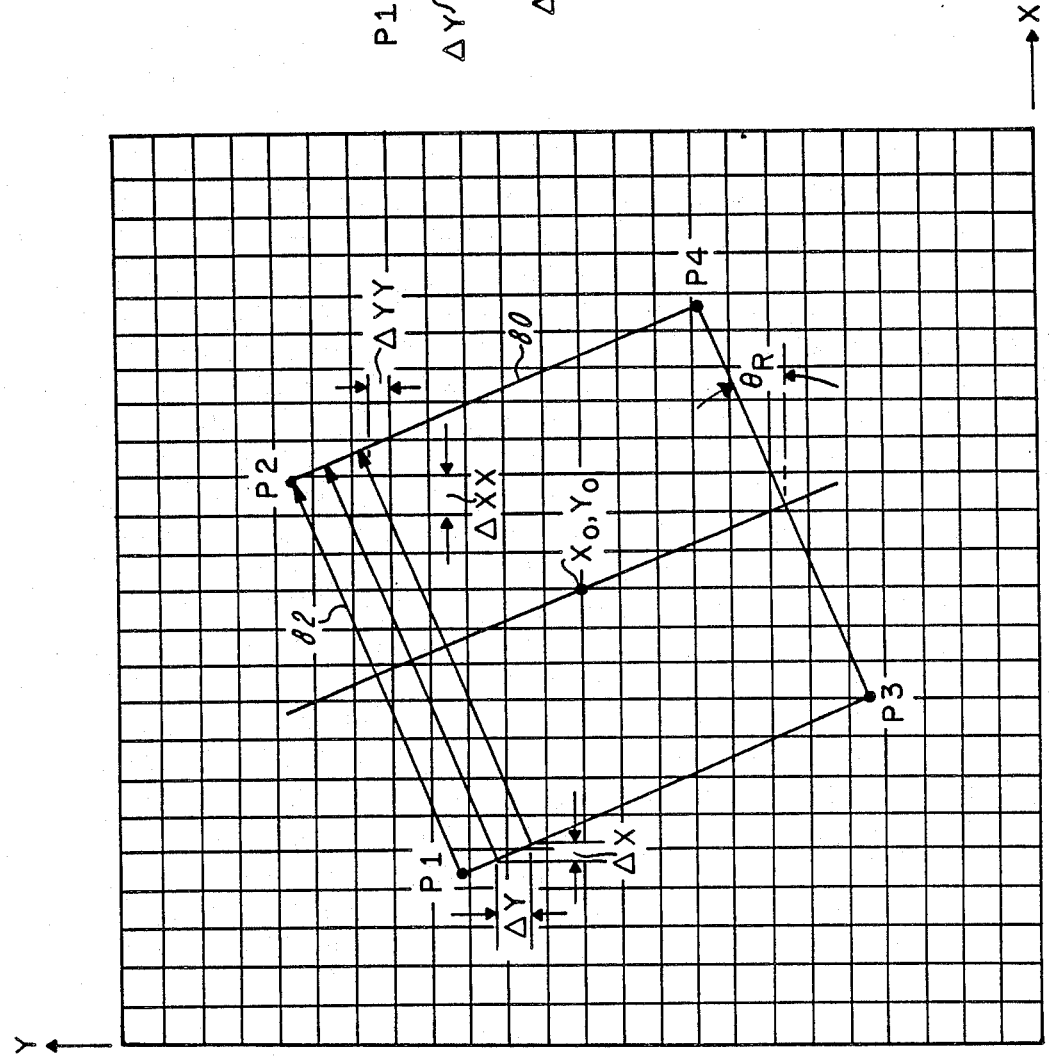

Referring now to FIG. 3, there is shown a graphical illustration of the parameters involved in addressing the cache memory 26. The point Xo, Yo represents the map center The arrows X and Y represent the orthogonal axes of the logical cache memory storage array. The array is seen to be configured as nine segments, each comprised of 64 bytes, each byte having a unique address. The storage segments are arranged along rows parallel to the X axis and columns parallel to the Y axis. Points P1, P2, P3, and P4 represent the corners of a rectangular envelope 80 disposed at an angle $\phi_r$ with respect to the X, Y coordinate system. The storage location represented by the point P1 represents the address of the storage element where a scan line of the cache memory 26 is to begin to read the map data encompassed by envelope 80 and the point P2 represents the address of the storage element where the scan line ends. It may be seen that each scan line originates from a different point along the line P1-P3 of the envelope 80. The number of origin points corresponds to the number of scan lines. The number of storage elements along each scan line corresponds to the number of displayable picture elements (pixels). The number of scan lines corresponds to the number of displayable scan lines in a complete frame.

The parameters defining the rotated set of points or origin and the rotated envelope will now be described. Referring to FIG. 3A, a scan line 82 is seen to originate at point P1. The slope of line 82 is defined in conventional manner by the tangential components with respect to the horizontal X axis. Thus $\Delta YY$ defines the vertical displacement with respect to an arbitrary horizontal measure $\Delta XX$. The parameters $\Delta YY$ and $\Delta XX$ may be dynamically varied by the processor 22, thereby providing a flexible and programmable line-to-line scan capacity. For the rectangular scan mode, parameters $\Delta XX$ and $\Delta YY$ will be held constant.

In a similar manner, the slope of the points of origin between successive scan lines 82 and 84 is defined by the tangential components $\Delta X$ and $\Delta Y$. Varying the ratio of $\Delta X$ and $\Delta Y$ or their individual magnitudes will vary the slope of the sides of the envelope 80. These parameters are also programmable by the processor 22.

Figure 4:
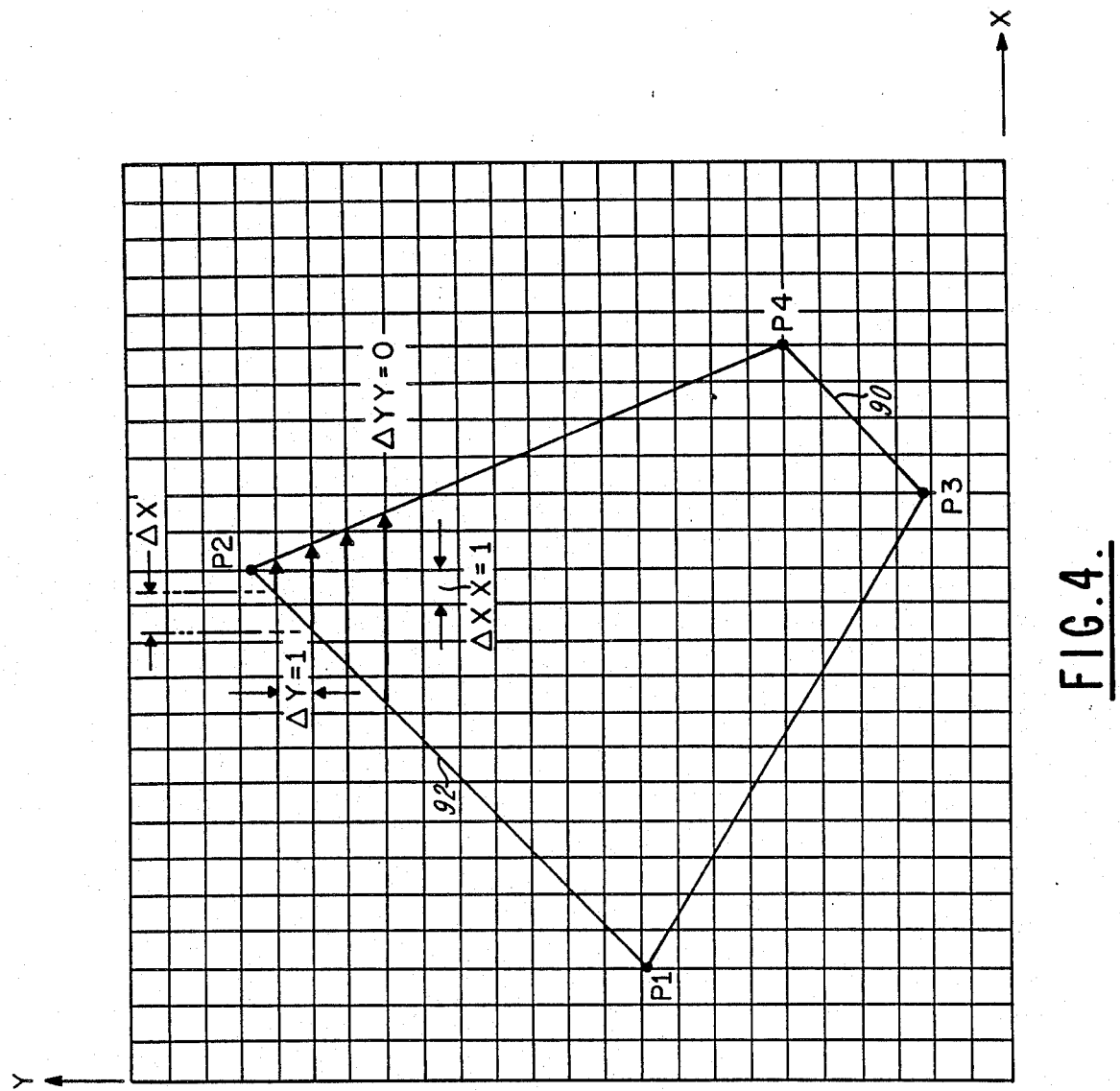
FIG. 4 is a diagram showing a trapezoidal scan pattern generated by the present invention.

FIG. 4 shows a graphical representation of a trapezoidal scan envelope 90. The points P1, P2, P3, and P4 define the contour of the area to be scanned. However, in trapezoidal mode the scan lines are oriented parallel to the X axis to permit a 1:1 correspondence with the segmented storage elements. The parameter $\Delta XX$ is set to 1, and $\Delta YY$ is set to 0. The slope of a side 92 of the trapezoid 90 is determined by the parameters $\Delta X$ and $\Delta Y$. In order to assure that the position generated by the address generator correspond with identical storage segments from frame to frame, $\Delta Y$ is set to 1 and $\Delta X$ will determine the slope of side 92. In this manner, the segmented storage elements of the cache memory are locked to the map display, and the same polygon will be generated from frame to frame.

Figure 5:
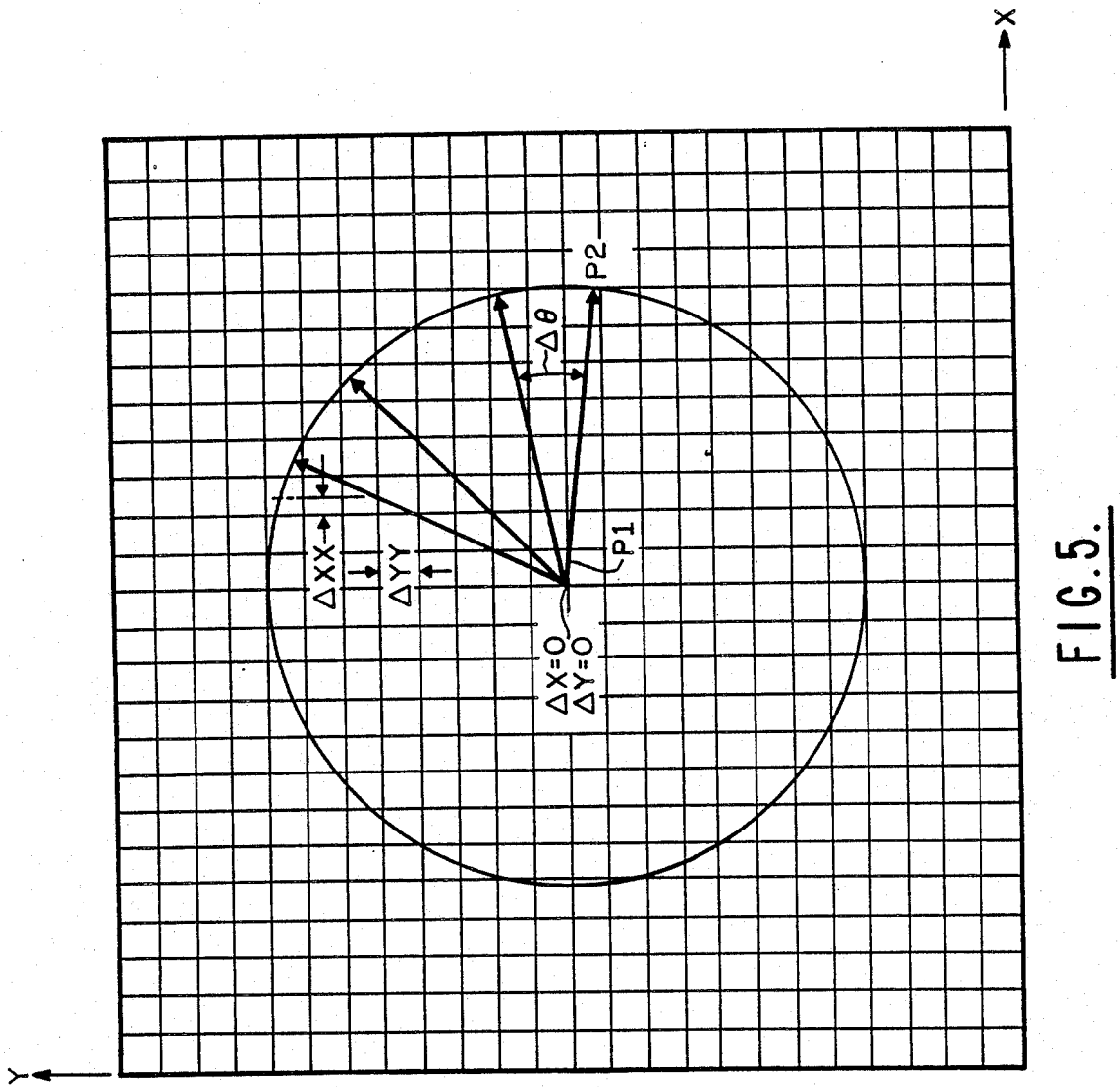
FIG. 5 is a diagram showing a star scan pattern generated by the present invention.

A star or radial scan pattern, which may be used, for example, for overlaying a target pattern on a terrain display, is generated as shown in FIG. 5. An origin 0.0 at a center point P1 of the display and a radius defining the scan line P1-P2 is calculated by the processor 22. Start and stop angles or an angle of change $\Delta\theta$ may also be defined. The input commands are applied to processor 44 where sine and cosine lookup tables generate the corresponding parameters $\Delta XX$ and $\Delta YY$ defining the slope of each successive scan line. The point of origin is always held constant at P1 ($\Delta X, \Delta Y=0$). It is a feature of the present invention that the display may be modulated based on aircraft altitude, sensor, and terrain height by providing a data flag corresponding to the address generated by the address generators.

Figure 6:
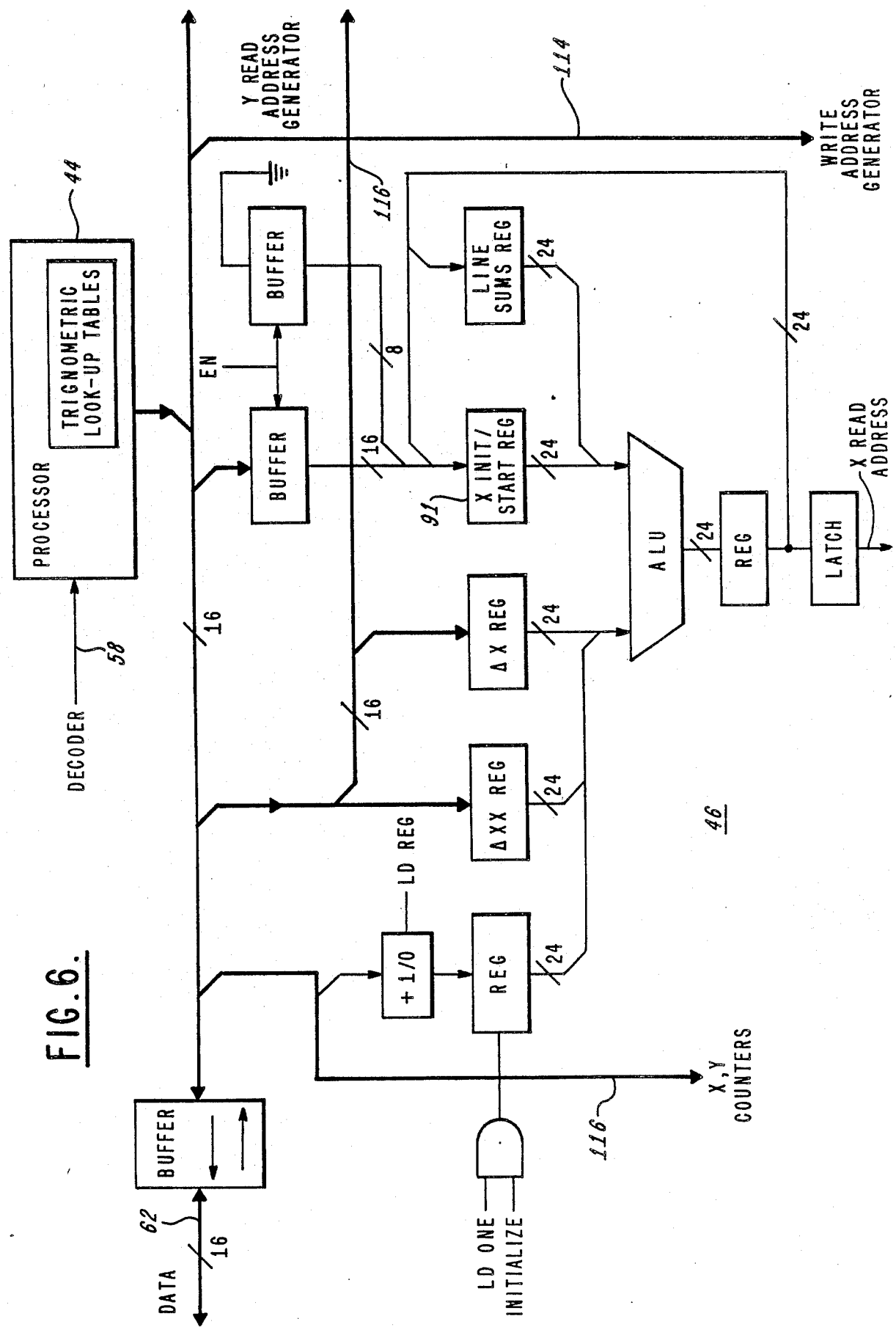
FIG. 6 shows the details of the X and Y read address generator.

The operation of the address generator will now be explained. Referring to FIG. 6, which shows a detailed circuit of the read address generator, read address generator 46 is basically an arithmetic logic unit which performs a series of incremental adds after receiving a starting X, Y point, scan line slope or pixel-to-pixel increment $\Delta XX$, $\Delta YY$ values, and line-to-line slope increment values $\Delta X$, $\Delta Y$, which is the pixel-to-pixel distance between scan line starting points, from the processor data bus 62. The initial X and Y starting points are calculated by the processor airborne computer using a normalized coordinate system and the aircraft heading information. These initial into the X register 91 and corresponding Y register (not shown) P2, P3, P4) based on the scale, center/decenter mode, zoom, heading, and aircraft position. The four cache point addresses surrounding the calculated point position for a bilinear interpolation or the nearest neighbor processing are calculated by methods well known in the art. See, for example, U.S. Pat. No. 4,528,693, and *Digi-* tal *Picture Processing*, Rosenfeld and Kak, 2nd Ed., Vol. 2, pp. 33-36. While FIG. 6 refers to the X coordinate address generator, the Y coordinate generator functions in an identical manner, except that the parameters loaded are, of course, the Y axis increments and starting point.

Processor 44 comprises addressable sine and cosine PROM's which receive angular parameters from the data bus 62 for calculating the linear coordinate increments in the star display mode. Processor 44 uses the input data parameters from the airborne computers (i.e. mode and four corner points or center point, radius, angle of change, and start/stop angles). These parameters are used to set default values or calculate the parameters used by the address generator: $\Delta XX$, $\Delta YY$ (scan line slope); $\Delta X$, $\Delta Y$ (slope from scan line to scan line); line lengths; and number of lines. The X read address generator 46 generates addresses to read from cache memory, passes value through (adds zero), adds one to the previous address and adds a delta value to a previous address. Delta value can be positive or negative and can be any absolute value from zero to 3.999 (approximately). Depending upon programming, these addresses can be generated as across a line or aspects of four points across a line set up as (X,Y), (X+1,Y), (X,Y+1), (X+1,Y+1). The addresses can be generated at 100 nanosecond time intervals. A rectangular, trapezoidal, or star shape of points can be created with any orientation.

Figure 7:
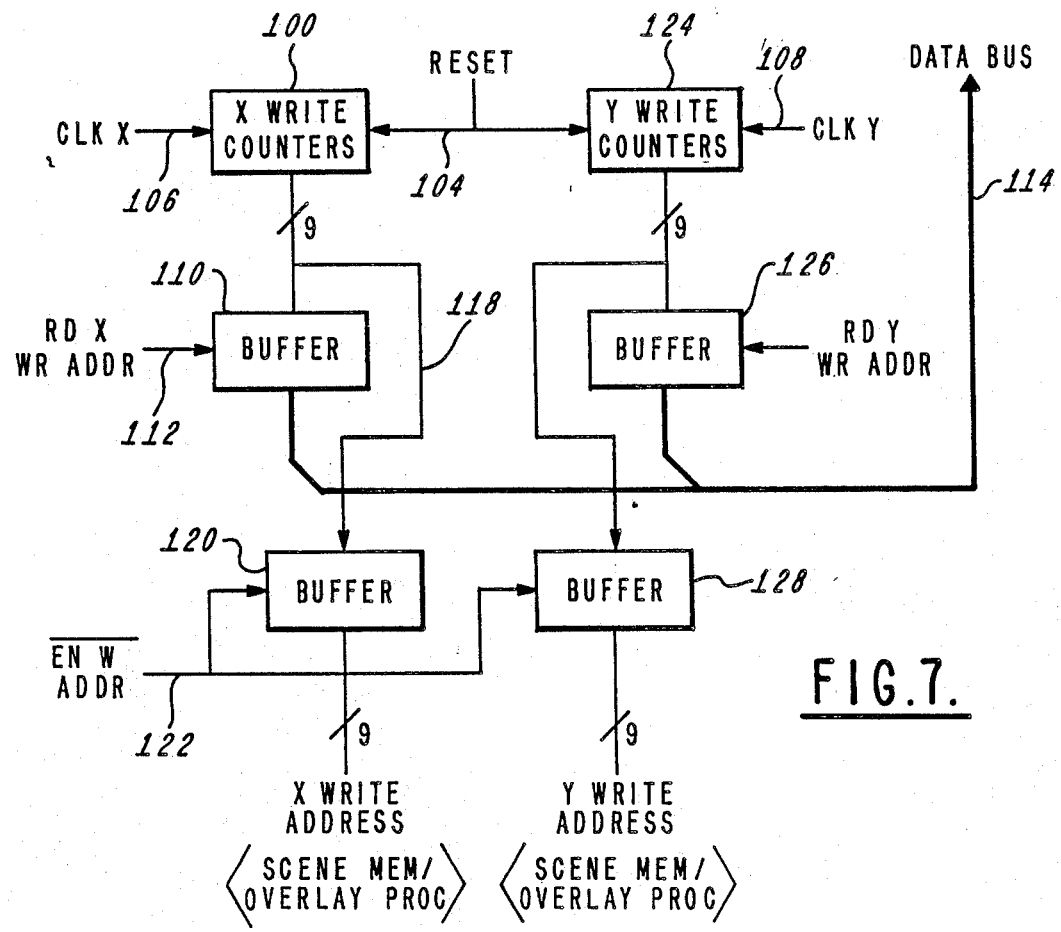
FIG. 7 shows the details of the X and Y write address generators.
Figure 8:
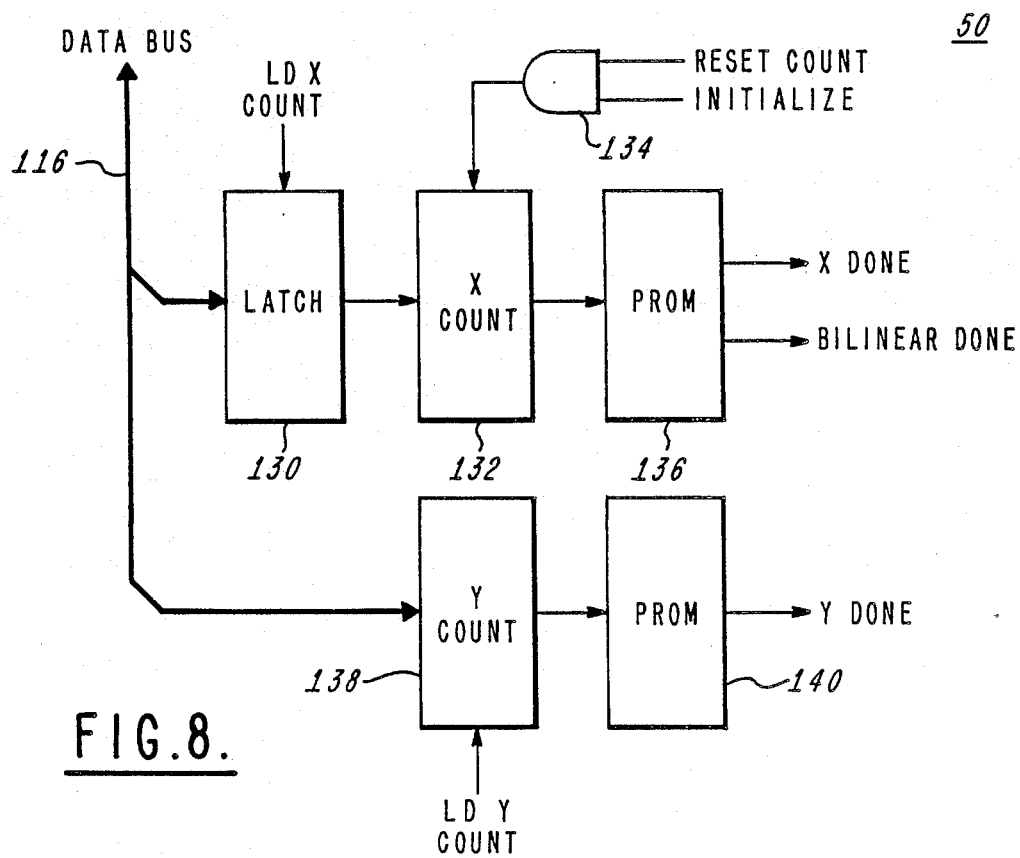
FIG. 8 shows the details of the X and Y line counters.

FIG. 7 shows the details of the X and Y write address generators, and FIG. 8 shows details of the X and Y line counters X and Y count parameters are provided on bus 116 from the airborne computer. The X count is loaded into a latch and stored by the LD X count command from decoder 40. The value stored in latch 130 represents the number of pixels in a line, which corresponds to the length of the line for a given pixel-to-pixel increment. The value in latch 130 is applied to load an initial X count into counter 132 on an INITIALIZE command from decoder 40 applied to gate 134. On subsequent commands, counter X is decremented after each address is generated along the scan line until a count of 1 is reached, indicative of the end of the scan line. This signal applied to PROM 136 is indicative of the completion of data transfer from the cache memory along the scan line.

In a similar manner, Y count 138 is loaded and decremented after the completion of each scan line. Counter 138 is initialized with a count indicative of the number of scan lines in a frame, while PROM 140 provides a signal when the complete frame of data has been transferred.

In the display list mode, typically the X count would be comprised of 256 pixels and the Y count would be comprised of 4 lines. In the map display mode, the X count is typically 484 pixels and the Y count also 484 pixels. The count is adjusted by the airborne computer to allow for the display mode, such as bilinear interpolation, and high resolution or low resolution operational modes. The outputs of the X and Y counters provide a signal X DONE indicating the end of each scan line count and Y DONE indicating when a block transfer operation is complete. In the map mode, the counters are loaded to take into consideration the additional counting steps needed to find the four points around each address used for bilinear interpolation, and a BILINEAR DONE signal is generated.

The write address generators consist of counters used to provide addresses to a full-field bit mapped scene memory for the transfer of display data or to an overlay memory for the transfer of overlay data. They are clocked directly by the timing generator and state sequence 52. An X write counter 100 and a Y write counter 124 are coupled to a reset line 104 which is fed by the decoder 40. On reset the counters are cleared to accept a new count sequence. Timing and sequence generator 52 provides a 10 MHz clock X signal on line 106 to the X write counter and a 10 MHz clock Y signal on line 108 to the Y write counter. The output of X counter 100 is coupled to a first buffer 110 which is enabled by a read signal 112 from the decoder 40. This provides a signal indicative of the X write counter status to data bus 114. The output of X write counter 100 is coupled on line 118 to a second buffer 120. Buffer 120 when activated by a write enable strobe from timing generator and sequence controller 52 applies an X write address to the display full-field memory (not shown). The Y write counter circuit, comprised of counter 124 and buffers 126 and 128, operates in a manner similar to the X write counter circuit, hence need not be described in detail.

Figure 9:
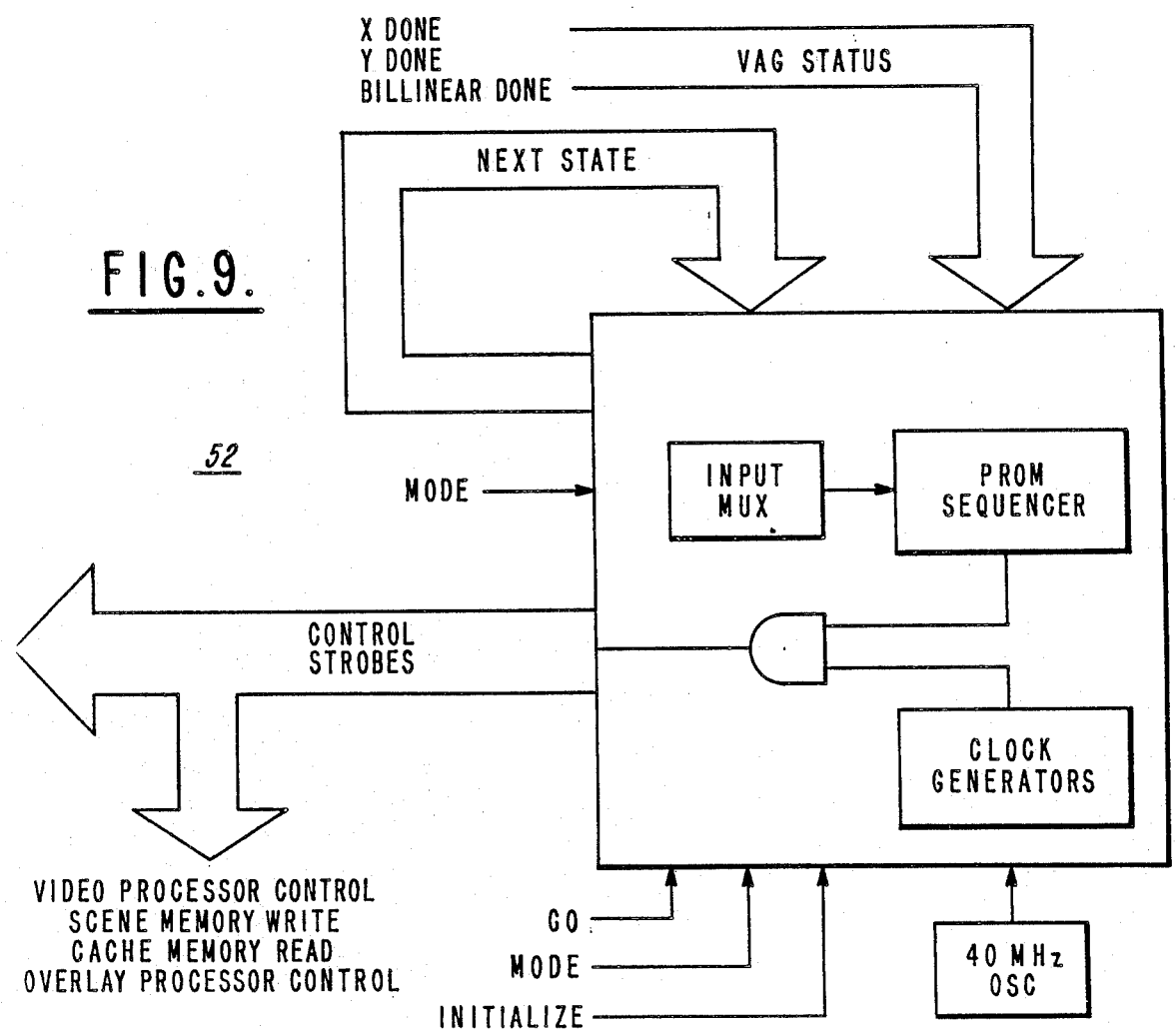
FIG. 9 is a block diagram of the timing and sequence generator.
Figure 19:
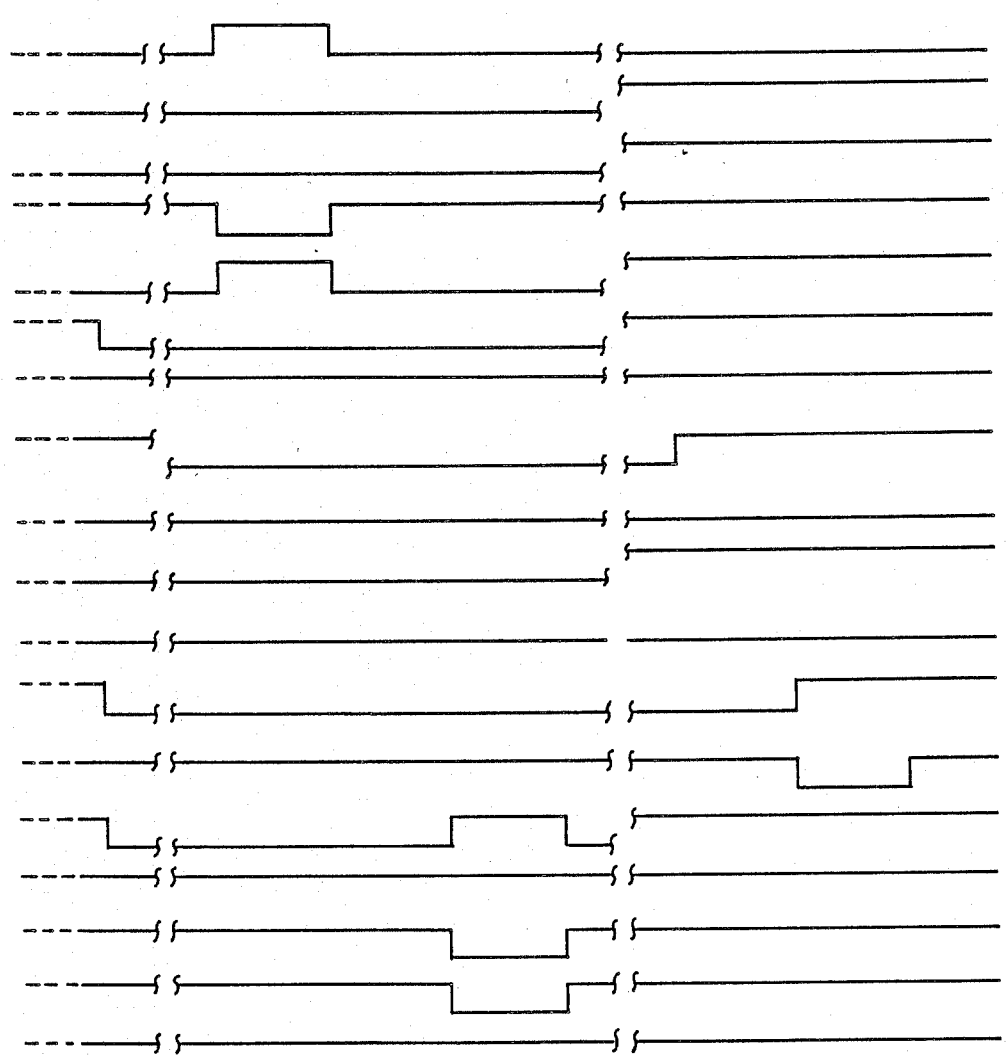
FIG. 19 is timing diagram showing the phase relation between waveforms generated by the timing and sequence generator.

Referring now to FIG. 9 which shows details of the timing generator and state sequence 52, and FIG. 19 which shows the timing sequences and their relative phases, the address generator circuit is provided with all of the necessary control signals and clocks required for its operation during the different modes. A 40 MHz oscillator is divided to provide a controlling 10 MHz clock frequency and several phases of the 10 MHz clock. After the airborne computer has supplied the address generator with the necessary initialization and control parameters, it starts the timing generator and sequencer 52. Circuit 52 then provides the required internal control signals based upon its multiplexed inputs to generate the addresses and output control signals as necessary for the mode that the airborne computer has loaded into the address generator decoder. The sequencer 52 also provides control signals to a video processor for use in its bilinear interpolation circuitry, clock signals to the cache and scene memories to read or write data, 10 MHz clocks, control signals to the overlay processor to transfer display lists, and clock signals to the video processor and to the overlay processor. The multiplexed inputs include X done, Y done, bilinear done, last line, address generator done, and other related signals.

Figure 10:
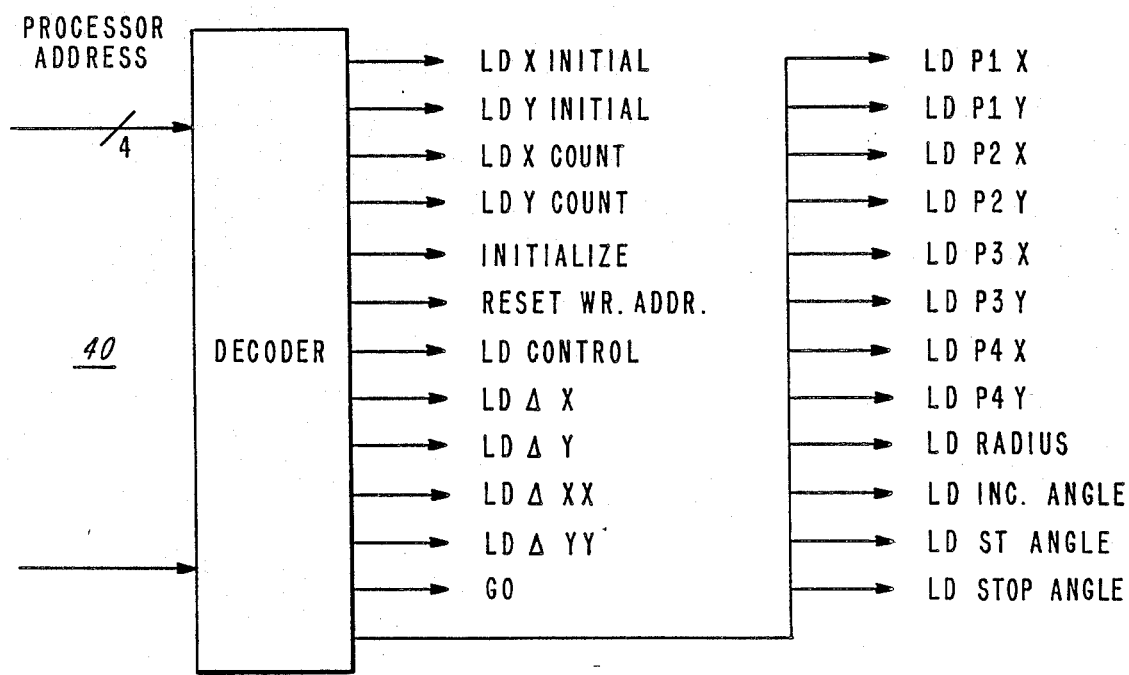
FIG. 10 shows details of the output parameters generated by the decoder.

FIG. 10 shows the output commands generated by the decoder 40 in response to the parameters from the airborne computer.

Figure 11:
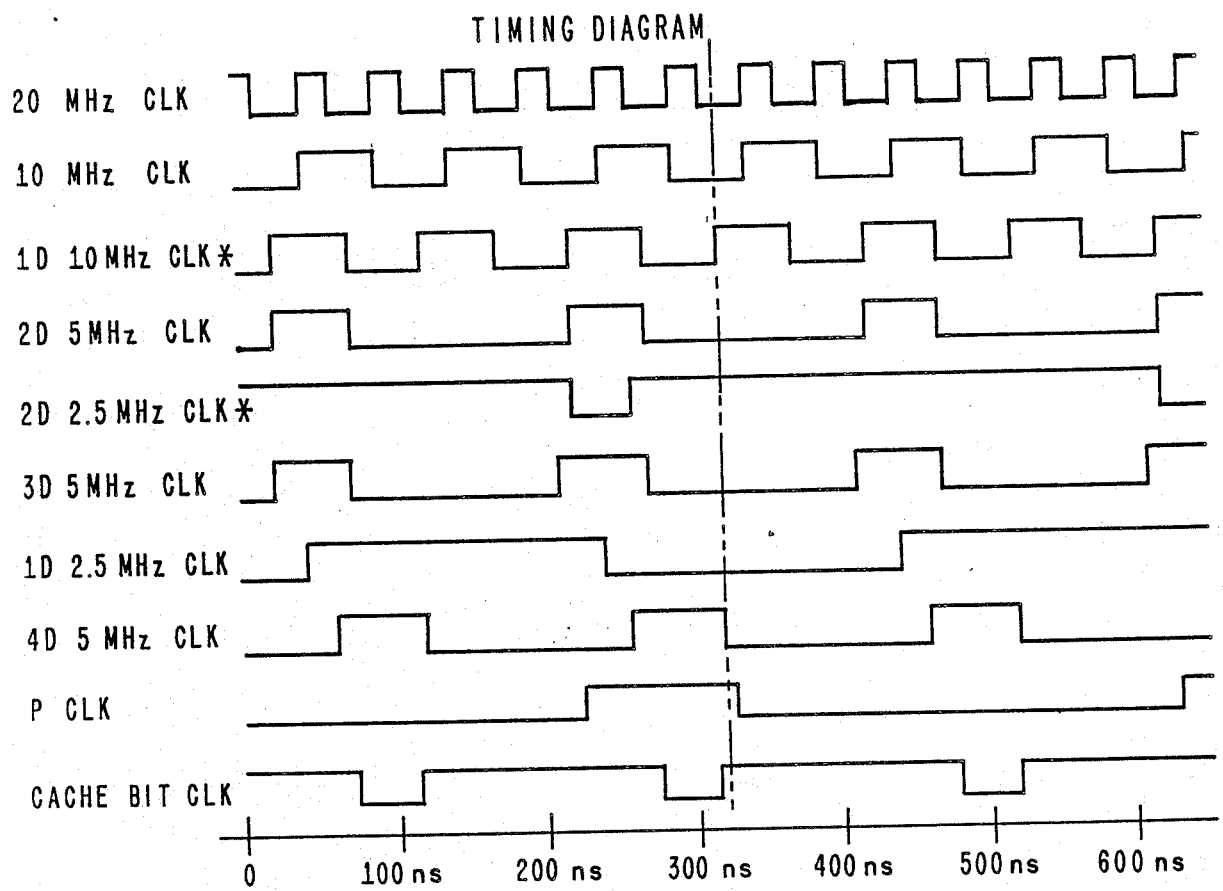
FIG. 11 is waveform diagram of clock signals generated by the timing and sequence generator.
Figure 14:
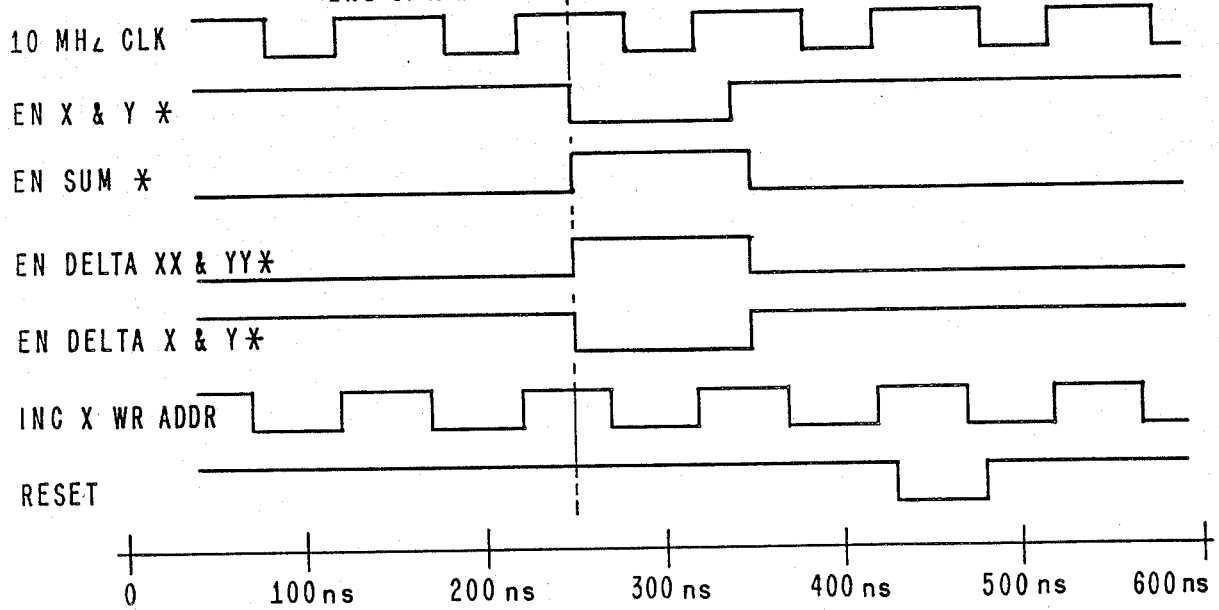
FIGS. 13 and 14 are timing diagrams for the nearest neighbor mode.
Figure 13:
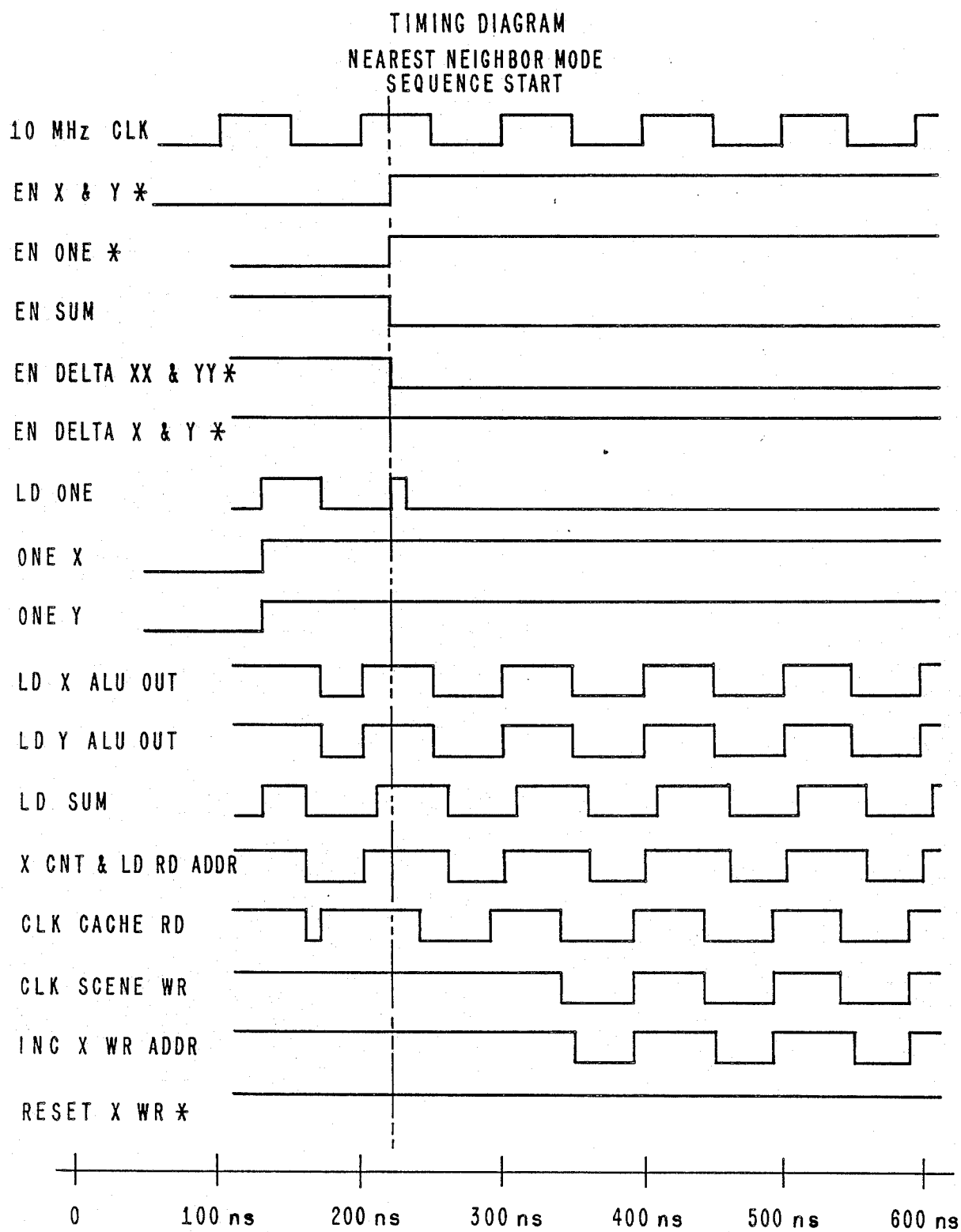
Figure 15D:
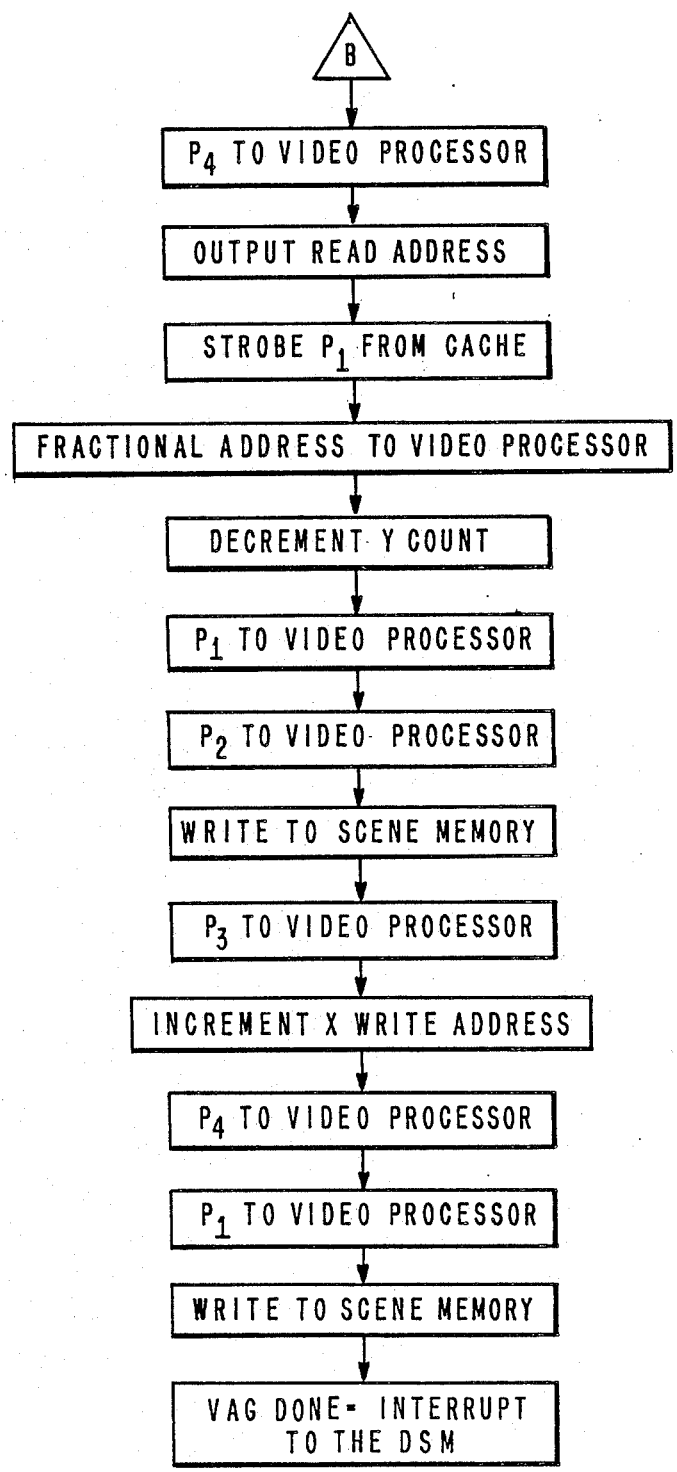
FIGS. 15 A–D are flow charts showing operation in the bilinear interpolation mode.
Figure 16:
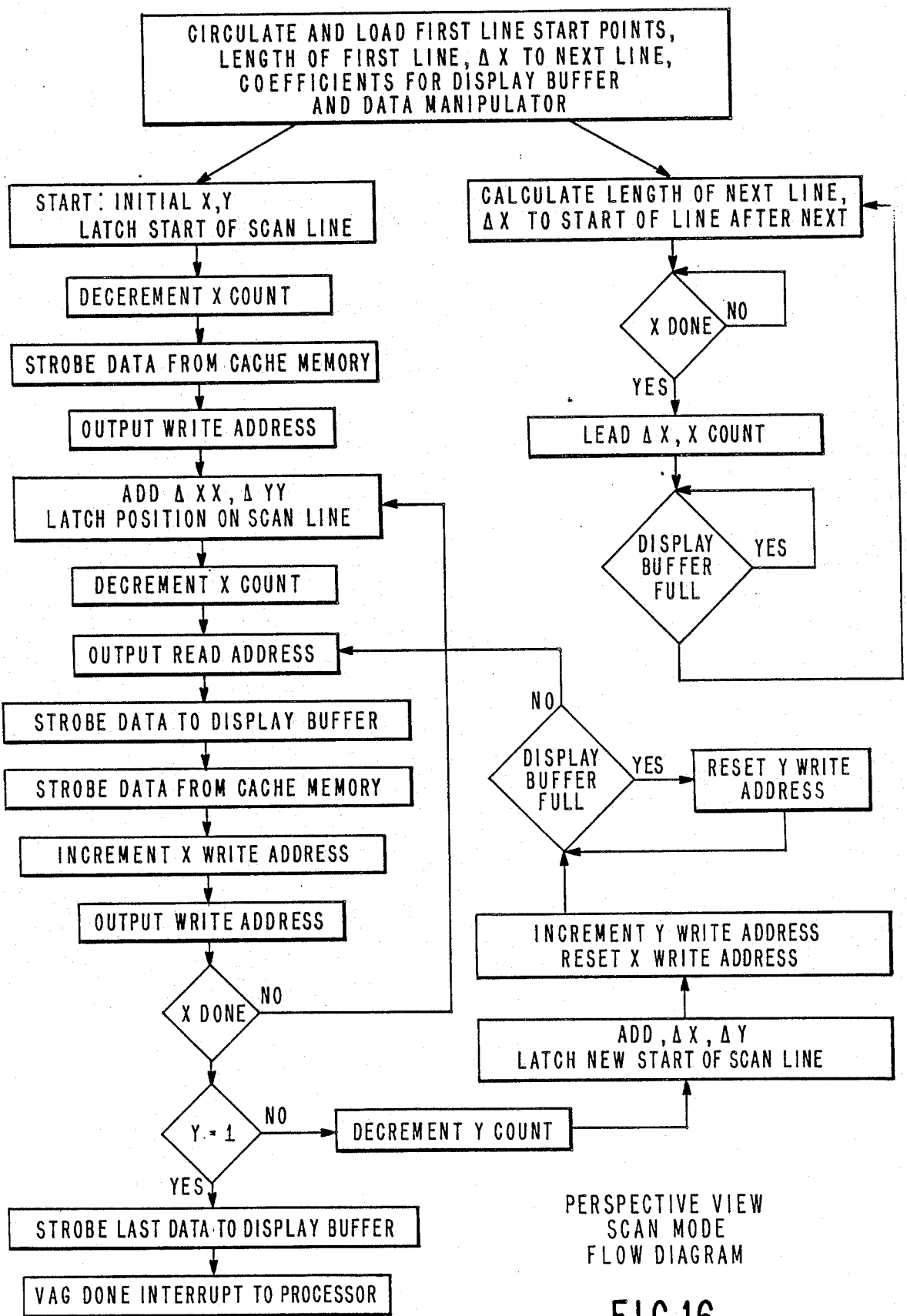
FIG. 16 is a flow chart showing operation in the perspective view scan mode.
Figure 17:
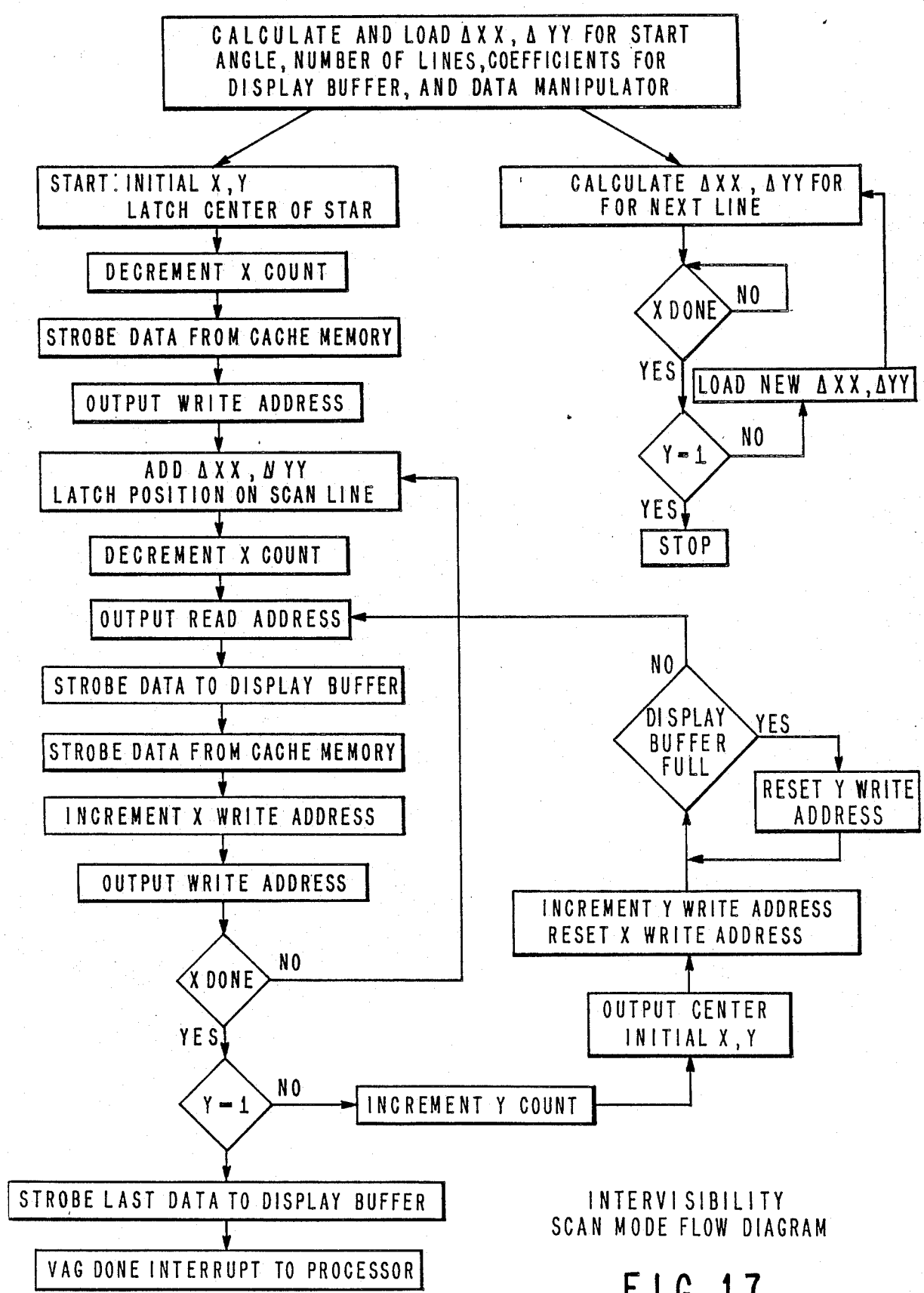
FIG. 17 is a flow chart showing operation in the intervisibility or radial scan mode.
Figure 18:
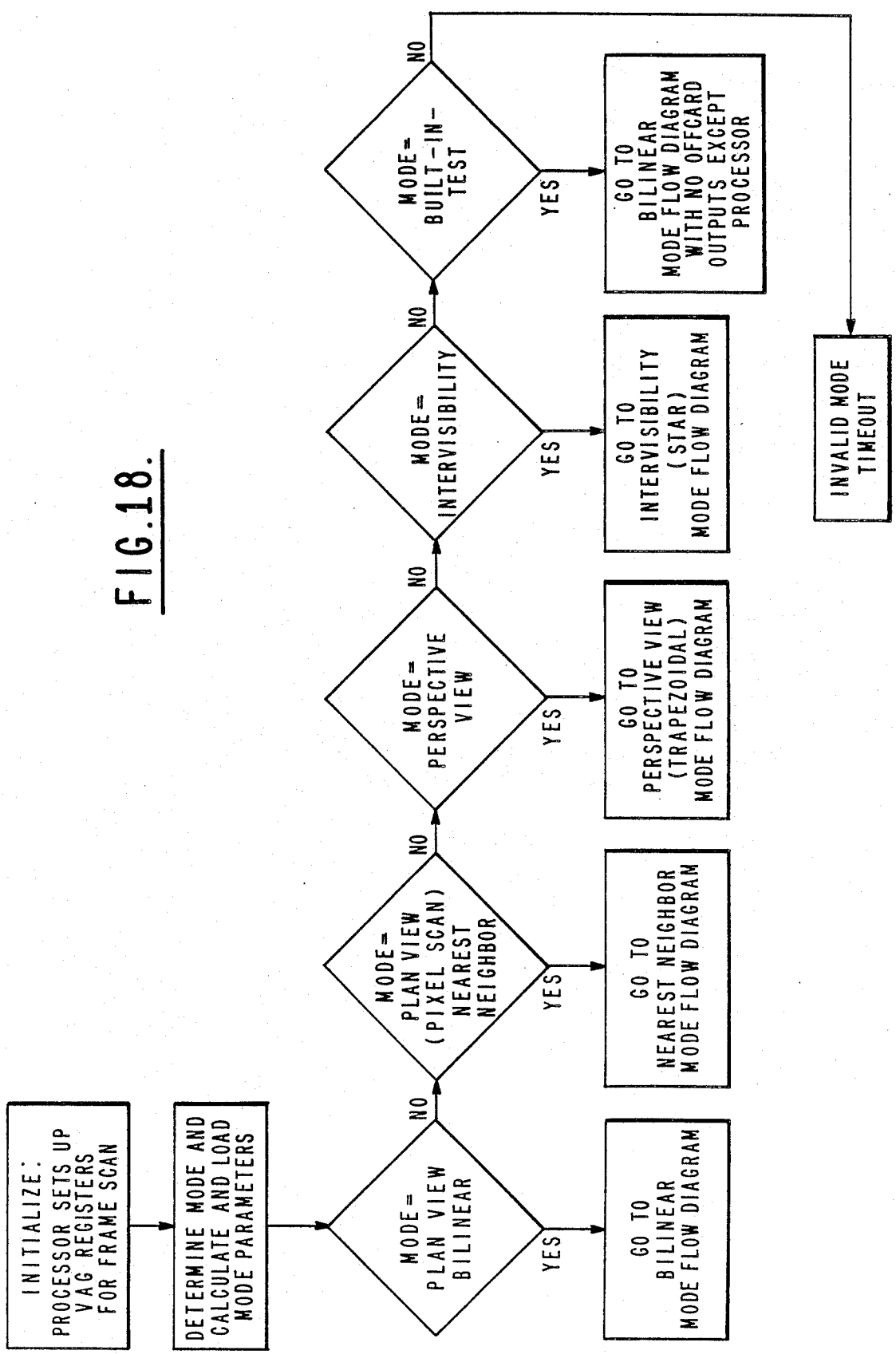
FIG. 18 is a top-down flow chart showing selection of a desired mode of operation.

FIG. 11 shows the clock signals generated by the timing and sequence generator 52. FIG. 12 shows a flow chart for the nearest neighbor mode, and FIGS. 13 and 14 are timing diagrams for the nearest neighbor mode. FIGS. 15 A-D are flow charts for the bilinear interpolation mode. FIGS. 16 and 17 are flow charts showing operation in the perspective view and radial scan view modes, respectively, while FIG. 18 is a top-down flow chart showing selection of a desired mode of operation. FIG. 19 is a timing diagram showing the relation of waveforms generated by the timing generator and sequence controller 52.

While the invention has been described in its preferred embodiments it is to be understood that the words which have been used are words of description rather than limitation and that changes may be made within the preview of the appended claims without departing from the true scope and spirit of the invention in its broadest aspects.

Embodiments of an invention in which an exclusive property or right is claimed are defined as follows:

1. An address generator for scanning a first addressable memory logically configured in a rectangular matrix wherein a pattern of data is stored in a predetermined orientation with respect to said matrix, and for writing to a second addressable memory comprising:

input means for receiving parameters from an external source, said parameters being programmable for providing a predetermined scan pattern from a plurality of scan patterns substantially independent of said predetermined orientation, processor means coupled to receive said parameters for computing angles of an envelope defining the contour of a scan pattern and angles of rotation for successive lines of said scan pattern, read address generator means responsive to said processor means for selectively generating address signals so as to read out said pattern information in a given direction with respect to said predetermined orientation, wherein said given direction is substantially independent of said predetermined orientation, and for providing incremental horizontal and vertical values of read addresses for generating each line of said scan pattern and reading values of digital signals stored in said first memory at corresponding addresses, write address generator means coupled to receive said parameters in the form of a first parameter defining a starting point of a first scan line, a second parameter defining the slope of said scan line, and a third parameter defining the slope of starting points of successive scan line, said first, second, and third parameters being dynamically and sequentially variable in accordance with command signals from said external source to form one of said plurality of scan patterns, for generating sequential write addresses for writing into said second addressable memory configured in a rectangular matrix, counter means for counting the number of incremental addresses in accordance with a predetermined line length and the number of scan lines in accordance with a predetermined line count and for providing a signal indicative of the completion of a scan line and a signal indicative of the generation of a complete frame at the completion of said line count, and timing means for generating timing and sequencing signals for generating each scan line, reading said first addressable memory along said scan lines, and writing the contents of said addressable memory into said second addressable memory.

2. An address generator as set forth in claim 1, wherein said parameters applied to said processor means comprise the corner points of a geometric figure.

3. An address generator as set forth in claim 2, wherein said geometric figure comprises a trapezoid.

4. An address generator as set forth in claim 3, wherein said scanning line shave a slope of zero with respect to a horizontal axis of said rectangular matrix and the slope with respect to said horizontal axis of an edge of said trapezoid defined by said envelope determines the start or end points of successive scan lines.

5. An address generator as set forth in claim 4, wherein said geometric figure comprises a rectangle.

6. An address generator as set forth in claim 5, wherein successive scan lines are scanned in parallel fashion with respect to one another, but not necessarily parallel to an axis of said rectangular matrix, and the slope of an edge of said rectangle defines the start or end points of successive scan lines.

7. An address generator as set forth in claim 2, wherein said geometric figure comprises at least a portion of a star having a plurality of radially extending members, and said input parameters comprise a center point, a line radius, and an included angle or a start angle and a stop angle defining an included angle.

8. An address generator as set forth in claim 2, wherein said processor means comprises trigonometric look-up tables responsive to address parameters for generating values of slopes of said angles in Cartesian coordinate form.

9. An address generator for scanning a first addressable memory logically configures in a rectangular matrix and writing to a second addressable memory comprising:

input means for receiving parameters from an external source, said parameters being programmable for providing a predetermined scan pattern, processor means coupled to receive said parameters for computing angles of an envelope defining the contour of a scan pattern and angles of rotation for successive lines of said scan pattern, read address generator means responsive to said processor means for providing incremental horizontal and vertical values of read addresses for generating each line of said scan pattern and reading values of digital signals stored in said first memory at corresponding addresses, write address generator means coupled to receive said scan pattern for generating sequential write addresses for writing into said second addressable memory configures in a rectangular matrix, counter means for counting the number of incremental addresses in accordance with a predetermined line length and the number of scan lines in accordance with a predetermined line count and for providing a signal indicative of the completion of a scan line and a signal indicative of the generation of a completed frame at the completion of said line count, and timing means for generating timing and sequencing signals for generating each scan line, reading said first addressable memory along said scan lines, and writing the con tents of said first addressable memory into said second addressable memory;

wherein said read address generator means comprises:

an X read address generator and a Y read address generator for receiving parameters representative of the starting address of a scan line, first incremental X and Y correction values corresponding to a slope of said scan line, and second incremental X and Y correction values corresponding to the relative slope of successive scan lines, means for computing read addresses corresponding to at least one of said scan lines by summing the respective X and Y starting addresses and corresponding first X and Y incremental values and sequentially incrementing said summed read addresses by said first incremental values, means responsive to the completion of a scan line for summing the respective X and Y starting points and corresponding second X and Y incremental values, thereby defining the start of a successive scan line, and means for sequentially incrementing said read address by summing said first and second X and Y incremental values therewith until a predetermined plurality of scan lines defining a frame is completed.

10. An address generator as set forth in claim 9, further comprising:

means for sequentially addressing a plurality of storage location of said first addressable memory of the form P1=X,Y, P2=X+1,Y, P3=X,Y+1, P4=X+1, Y+1, said points neighboring a point corresponding to the value of a storage location in said first addressable memory.

11. A counter means as set forth in claim 9, comprising:

latch means for receiving and storing an initial X count corresponding to said line length from said input means, said latch means also responsive to a control signal from said input means to return or decrement said initial count, first presettable counter means responsive to said input means to be preset to said initial X count and responsive to said latch means for providing a decremented X count, first logic means coupled to said first presettable counter means to detect when a predetermined X count has been reached thereby and to provide a signal denoting completion of a scan line and for resetting the count of said first counter means to a further initial X count at a successive scan line, second presettable counter means responsive to said input means to be preset to an initial Y count corresponding to the number of scan lines in a frame and further responsive to said input means for providing a decremented Y count, and second logic means coupled to said second counter means to detect when a predetermined Y count has been reached, thereby to provide a signal denoting reading of a complete frame for writing the contents of said further addressable memory means into said display means.

12. A write address generator as set forth in claim 9, further comprising:

means coupled to said timing means for receiving regular clock pulses, address counting means for counting said clock pulses to produce an address for said second addressable memory, means for supplying said address to said second addressable memory to designate an address corresponding to a storage location therein in which stored data is written, and means coupled to said timing means for selectively enabling said means for supplying an address.

13. A write address generator as set forth in claim 12, further comprising mean for writing the contents of said second addressable memory into a display means.

14. A method for scanning a first addressable memory logically configured in a rectangular matrix and writing to a second addressable memory comprising:

providing control parameters from an external source, said parameters being programmable for providing a predetermined scan pattern, applying said parameters to a processor and computing angles of an envelope defining the contour of a scan pattern and angles of rotation for successive lines of said scan pattern, deriving incremental horizontal and vertical read address values for generating each line of said scan pattern from said computed angles, and reading values of digital signals stored in said first addressable memory at corresponding addresses, generating sequential write addresses for writing into said second addressable memory configured in a rectangular matrix, counting the number of incremental addresses in accordance with a predetermined line length and the number of scan lines in accordance with a predetermined line count and providing a signal indicative of the completion of a scan line and a signal indicative of the generation of a complete frame at the completion of said line count, generating timing and sequencing signals for generating each scan line, reading said first addressable memory along said scan lines and writing the contents of said first addressable memory into said second addressable memory, applying said parameters representative of the starting address of a scan line, first incremental X and Y correction values corresponding to a slope of said scan line, and second incremental X and Y correction values corresponding to the relative slope of successive scan lines to corresponding X and Y read address generators, computing read addresses corresponding to at least one of said scan lines by summing the respective X and Y starting addresses and corresponding first X and Y incremental values and sequentially incrementing said summed read addresses by said first incremental values, on completion of a scan line summing the respective X and Y starting points and corresponding second X and Y incremental values, thereby defining the start of a successive scan line, and sequentially incrementing said read addresses by summing said first and second X and Y incremental values therewith until a predetermined plurality of scan lines defining a frame is completed.

* * * * *